US011731866B2

(12) United States Patent
Hoekstra

(10) Patent No.: US 11,731,866 B2
(45) Date of Patent: Aug. 22, 2023

(54) IN-GROUND LIFTING SYSTEM FOR LIFTING A VEHICLE COMPRISING A COVER, AND METHOD FOR LIFTING A VEHICLE

(71) Applicant: Stertil B.V., Kootstertille (NL)

(72) Inventor: Hains Hoekstra, Kootstertille (NL)

(73) Assignee: Stertil B.V., Kootstertille (NL)

( * ) Notice: Subject to any disclaimer, the term of this patent is extended or adjusted under 35 U.S.C. 154(b) by 0 days.

(21) Appl. No.: 17/839,995

(22) Filed: Jun. 14, 2022

(65) Prior Publication Data

US 2022/0306439 A1 Sep. 29, 2022

Related U.S. Application Data

(63) Continuation of application No. 16/999,316, filed on Aug. 21, 2020, now abandoned.

(30) Foreign Application Priority Data

Aug. 22, 2019 (NL) .................................... 2023690

(51) Int. Cl.
*B66F 7/28* (2006.01)
*B66F 7/06* (2006.01)
(Continued)

(52) U.S. Cl.
CPC .............. *B66F 7/28* (2013.01); *B66F 7/0666* (2013.01); *B66F 7/08* (2013.01); *B66F 7/065* (2013.01); *H02J 7/02* (2013.01)

(58) Field of Classification Search
CPC ...... E04H 5/06; B66F 7/28; B66F 3/46; B66F 7/20; B66F 7/08; B66F 7/0666;
(Continued)

(56) References Cited

U.S. PATENT DOCUMENTS 2,564,289 A * 8/1951 Walker ...................... B66F 7/16
187/203
3,106,988 A * 10/1963 Hott .......................... B66F 7/20
187/203
(Continued)

FOREIGN PATENT DOCUMENTS

DE 202006007863 U1 8/2006
DE 102014113203 * 3/2016
(Continued)

OTHER PUBLICATIONS

Stertil Koni Retrofit Diamondlift; found at https://www.youtube.com/watch?v=fyisBzim5Lw (Year: 2015).*
(Continued)

*Primary Examiner* — Mahdi H Nejad
(74) *Attorney, Agent, or Firm* — The Webb Law Firm

(57) ABSTRACT

The invention relates to an in-ground lifting system and corresponding method for lifting a vehicle. The lifting system includes one or more lifts including at least one moveable lift; a support structure for mounting the one or more lifts in a pit; a moving drive configured for moving the one or more moveable lifts in the pit; a lifting drive configured for lifting one or more of the lifts for raising and/or lowering the vehicle; and a cover configured for covering the pit. The cover includes a number of cover elements. An individual cover element extends in a width direction of the pit. The cover elements are configured to move between a pit covering state and a lift moving state such that the one or more moveable lifts pass over and/or by the cover elements. The cover elements move when one of the one or more moveable lifts moving through the pit is approaching.

19 Claims, 20 Drawing Sheets

(51) Int. Cl.
*B66F 7/08* (2006.01)
*H02J 7/02* (2016.01)

(58) Field of Classification Search
CPC ...... B66F 7/065; B66F 7/16; B66F 2700/057; B61K 5/00; H02J 7/02
USPC .......................................................... 187/205
See application file for complete search history.

(56) References Cited

U.S. PATENT DOCUMENTS

| | | | |
|---|---|---|---|
| 5,259,482 A * | 11/1993 | Proulx | B66F 7/16 254/89 H |
| 5,404,968 A * | 4/1995 | Fletcher | B66F 7/14 187/218 |
| 8,191,865 B2 | 6/2012 | Polins et al. | |
| 10,065,842 B2 | 9/2018 | Jaipaul et al. | |
| 2015/0063902 A1 | 3/2015 | Schneider | |
| 2016/0039646 A1 | 2/2016 | Knapp | |
| 2016/0152454 A1 | 6/2016 | Stapensea et al. | |
| 2016/0332853 A1 | 11/2016 | Fijnvandraat | |
| 2017/0081158 A1 | 3/2017 | Jalpaul | |
| 2017/0088405 A1 | 3/2017 | De Jong et al. | |
| 2018/0072543 A1 * | 3/2018 | Rucker | B66F 3/00 |
| 2021/0309499 A1 | 10/2021 | Elliott et al. | |

FOREIGN PATENT DOCUMENTS

| | | |
|---|---|---|
| DE | 102014113203 A1 * | 3/2016 |
| DE | 102014113203 A1 | 3/2016 |
| DE | 202009019073 U1 | 5/2016 |
| WO | 2006112857 A2 | 10/2006 |
| WO | 2015108414 A1 | 7/2015 |

OTHER PUBLICATIONS

Stertil Koni Ecolift; found at https://stertilkoni.com/en/videos/ (Year: 2016).*

JAB_Commercial-vehicle-lifts (Year: 2011).*

* cited by examiner

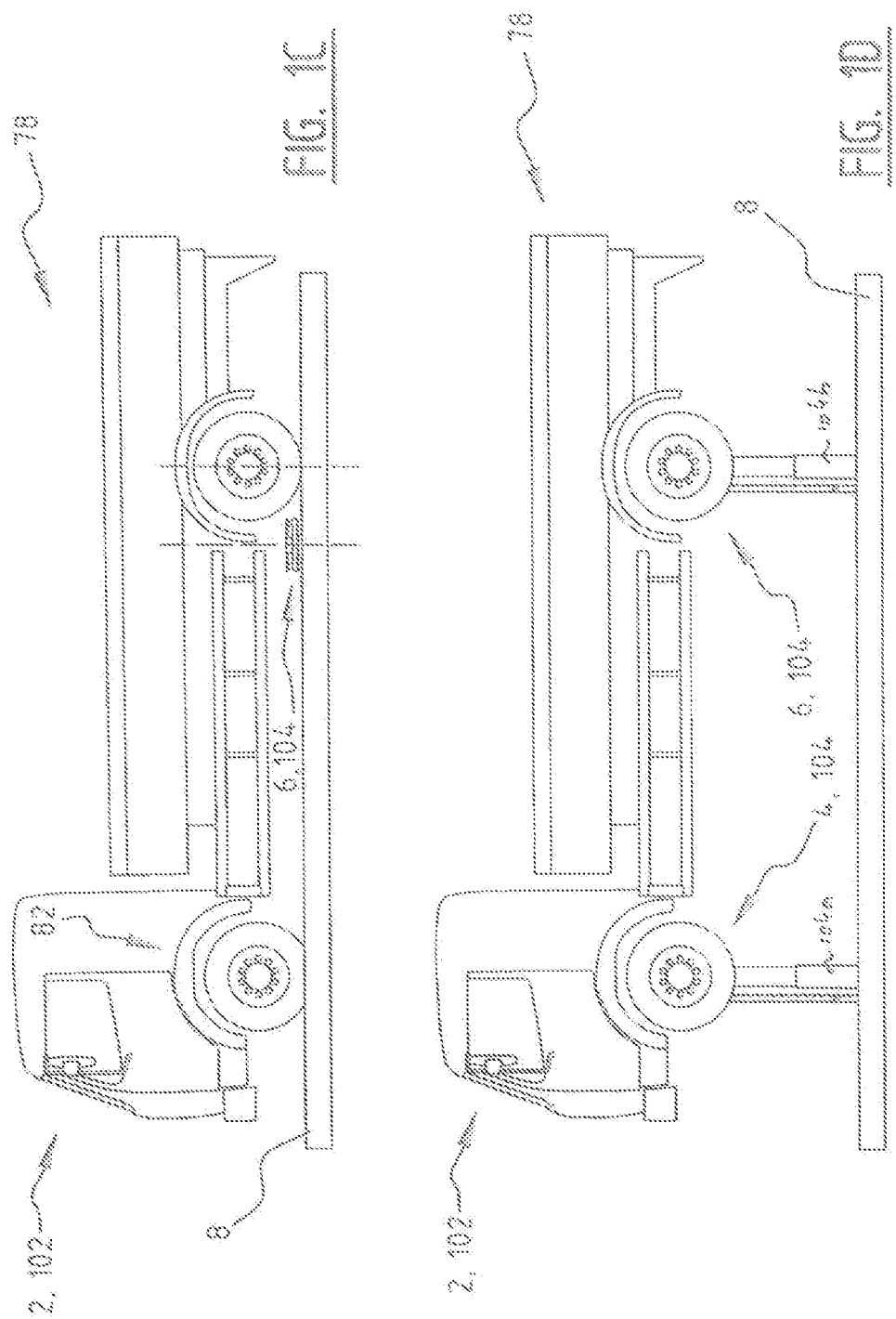

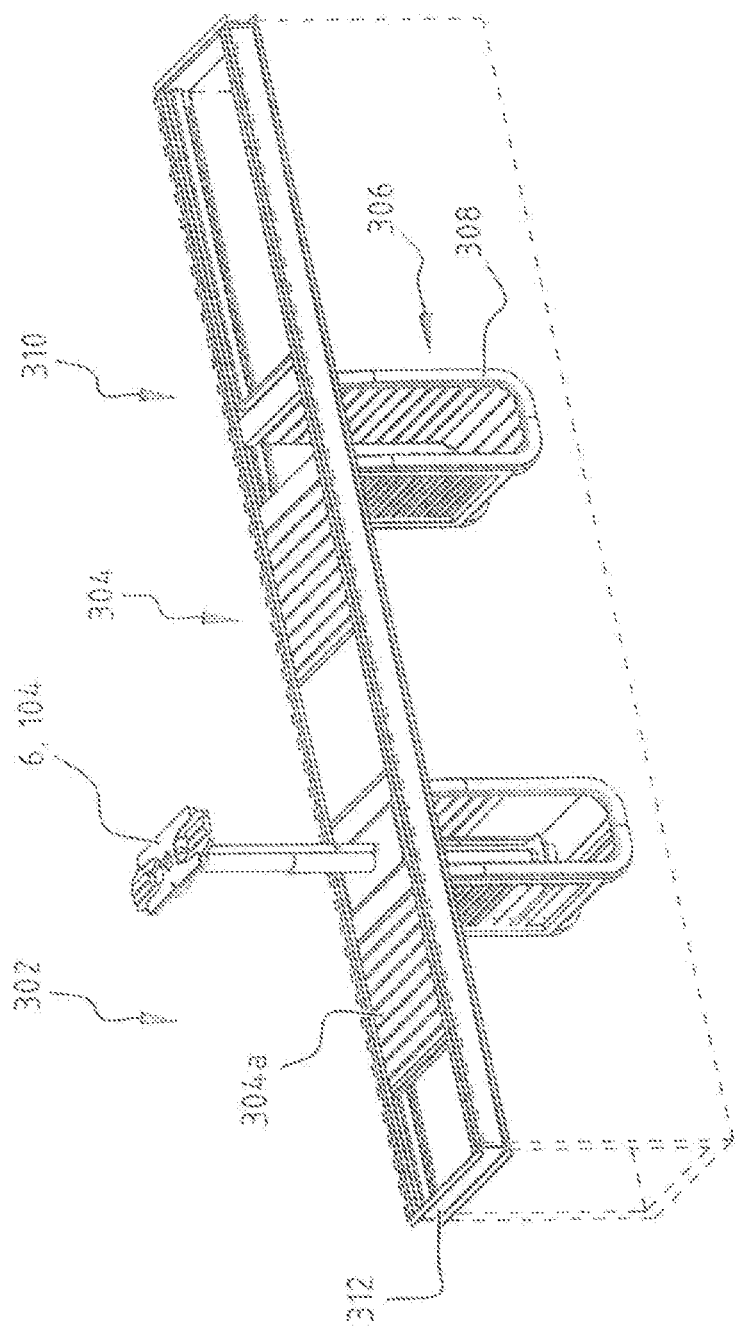

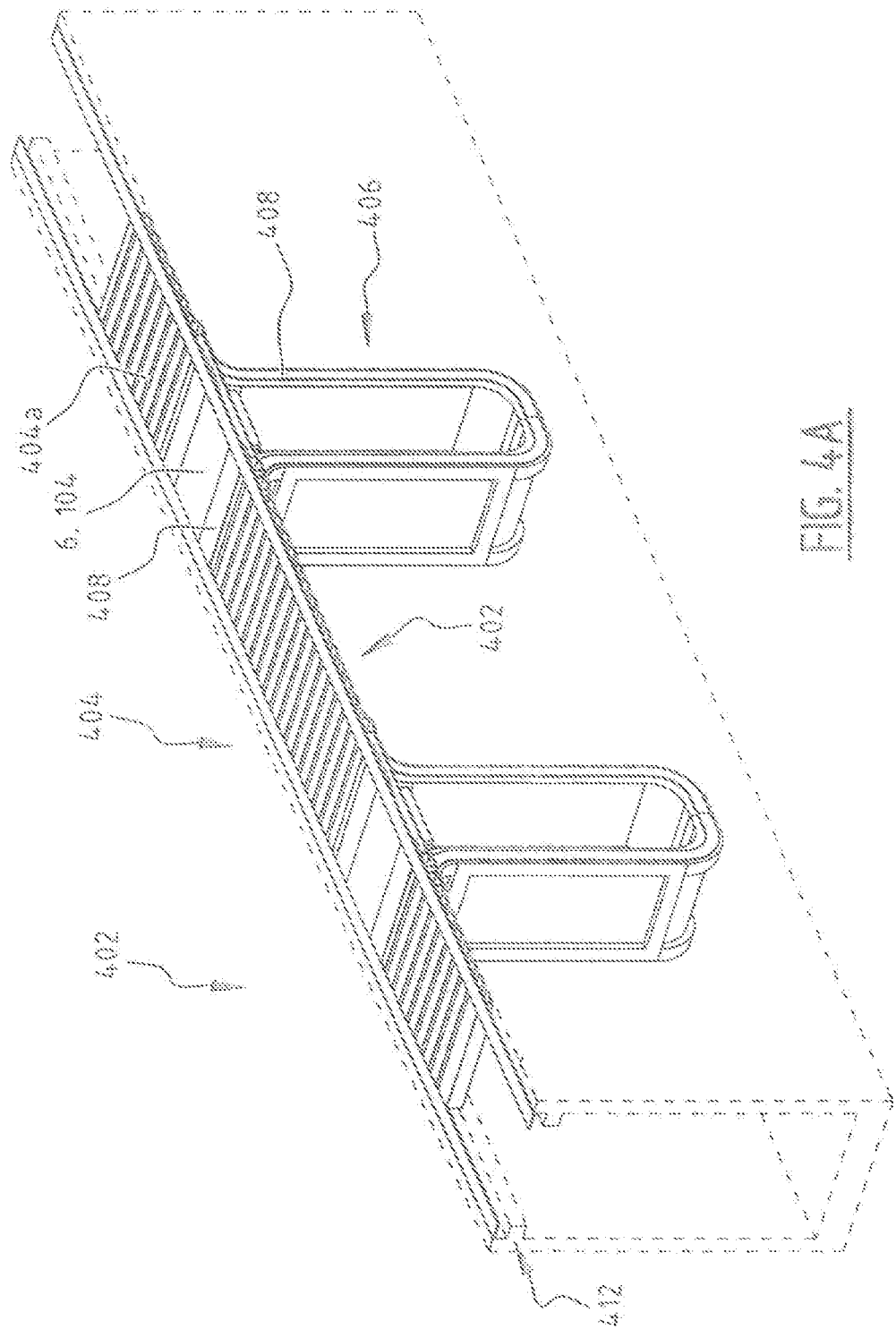

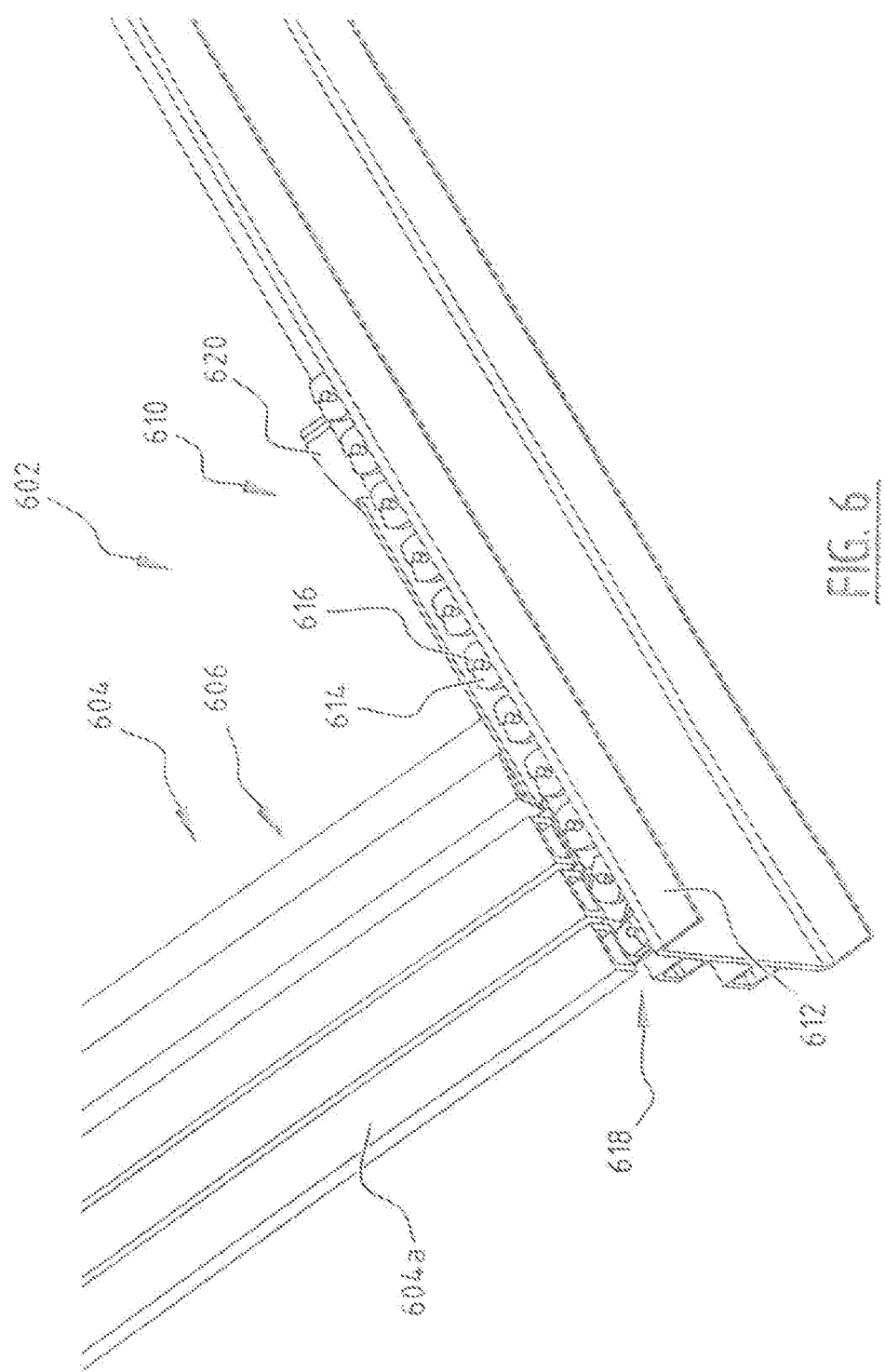

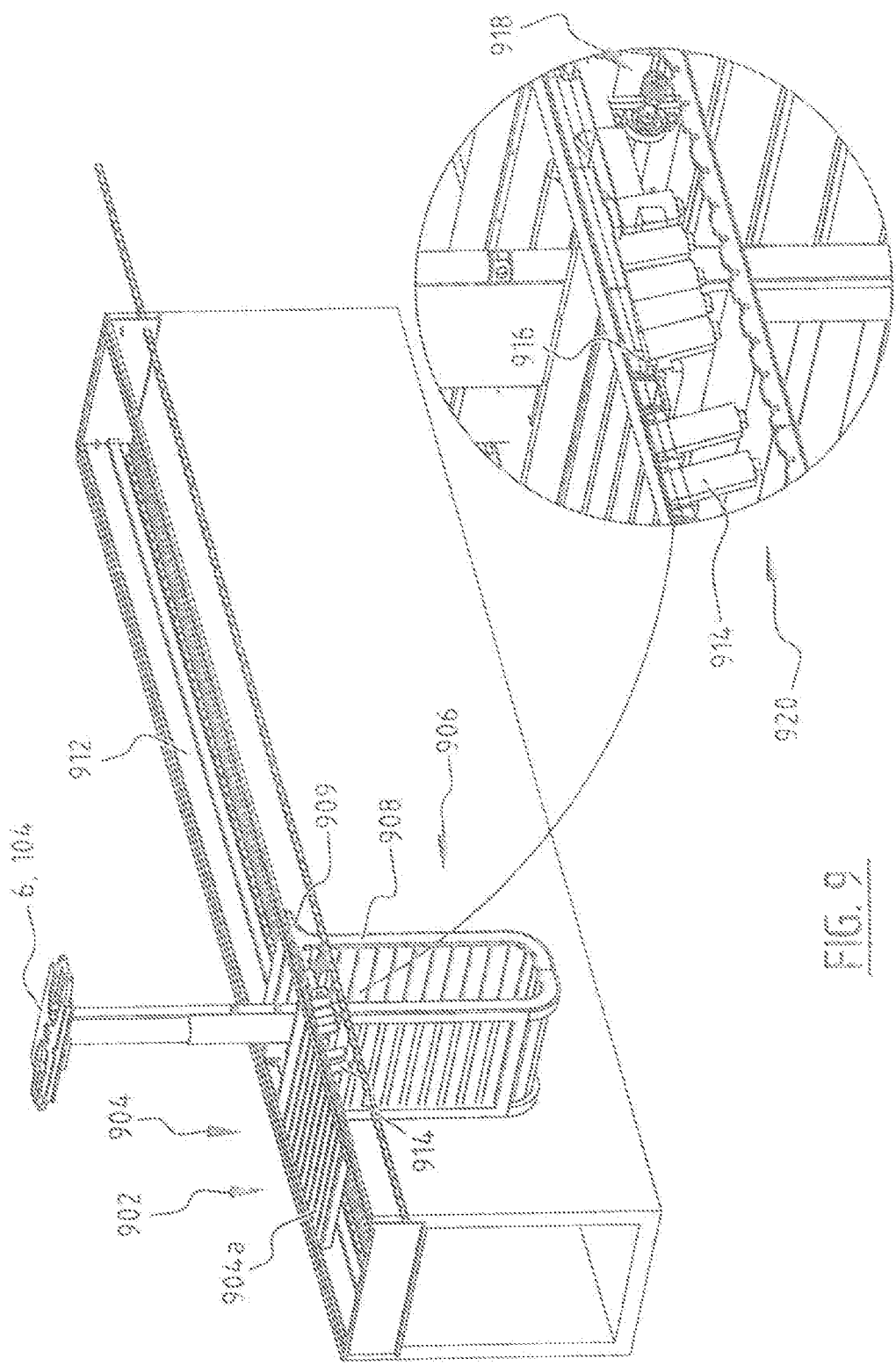

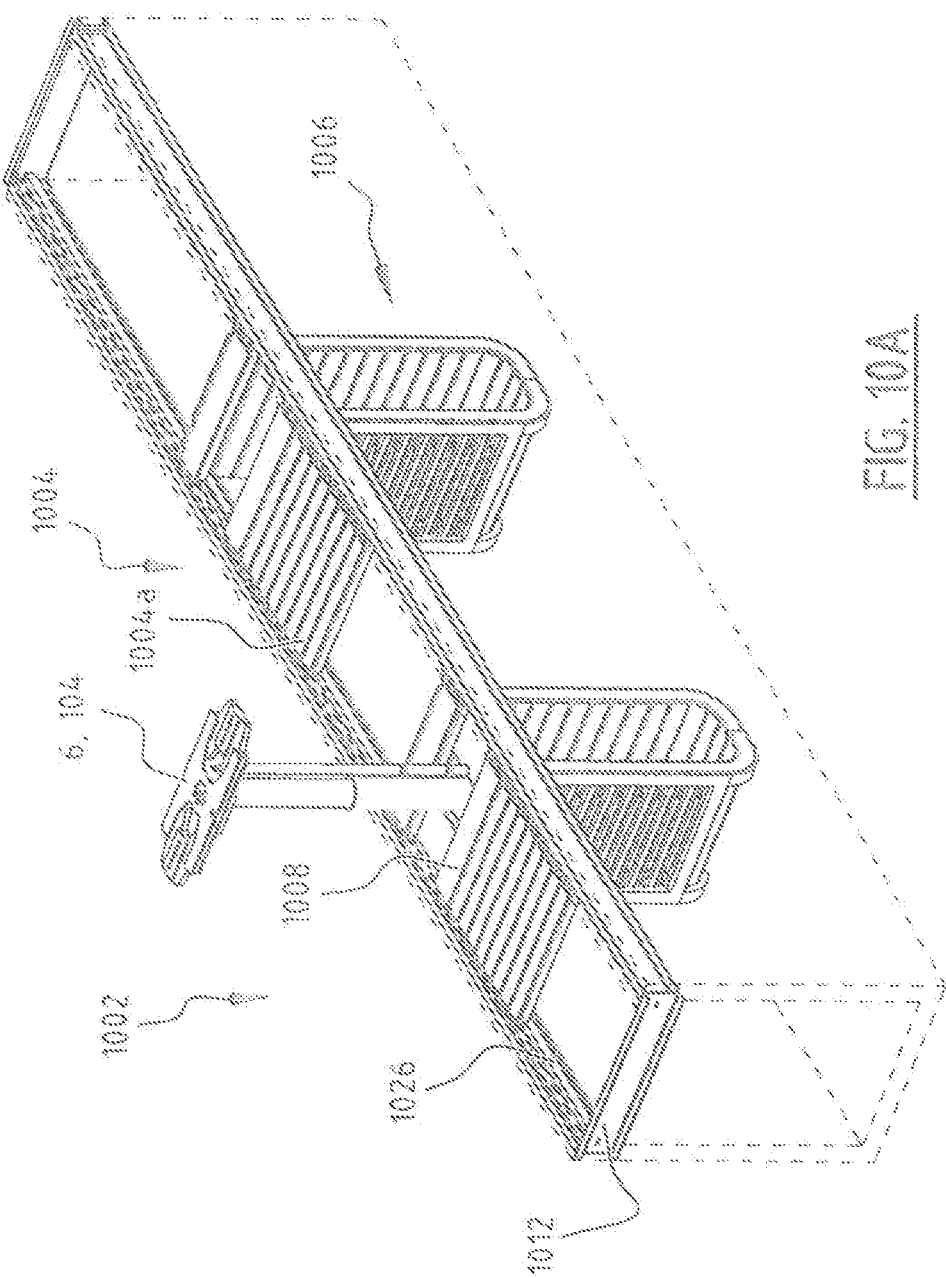

IN-GROUND LIFTING SYSTEM FOR LIFTING A VEHICLE COMPRISING A COVER, AND METHOD FOR LIFTING A VEHICLE

CROSS-REFERENCE TO RELATED APPLICATIONS

This application is a continuation of U.S. patent application Ser. No. 16/999,316, filed Aug. 21, 2020, which claims priority to The Netherlands Patent Application No. 2023690 filed Aug. 22, 2019, the disclosures of which is hereby incorporated by reference in their entirety.

BACKGROUND OF THE INVENTION

Field of the Invention

The invention relates to an in-ground lifting system, and more specifically to a system having a number of moveable lifting devices. Such systems are used for lifting trucks, buses, passenger cars and/or other vehicles.

Description of Related Art

Conventional in-ground lifting systems, such as disclosed in WO 2015/108414 A1, comprise a stationary lifting device that is positioned in a workshop. In use, an axle is positioned above the stationary lifting device. The lifting system also comprises a moveable lifting device that is then positioned below a further axle of the vehicle. This moveable lifting device is moved in a so-called pit. This enables the lifting system to deal with different wheelbases of the vehicles to be lifted. Usually, a cover is provided to cover the opening of the pit to provide a safe working place, also when the moveable lifting device is moving in the pit. These conventional systems are custom made, thereby resulting in complex and relatively expensive lifting systems.

These conventional lifting systems are capable of lifting vehicles with different wheelbases. However, to guarantee a safe working environment, conventional lifting systems require a cover system that preferably moves with the moveable lifting device. Such conventional cover system is relatively complex and has a significant impact on the costs of the conventional lifting systems.

SUMMARY OF THE INVENTION

An objective of the present invention is to obviate or at least reduce the aforementioned problems and to provide an in-ground lifting system that is more flexible and effective, and is preferably more (cost) efficient.

This objective is achieved with the in-ground lifting system according to the invention for lifting a vehicle, the lifting system comprising:
  one or more lifts comprising at least one moveable lift;
  a support structure for mounting the one or more lifts in a pit;
  a moving drive configured for moving the one or more moveable lifts in the pit;
  a lifting drive configured for lifting one or more of the lifts for raising and/or lowering the vehicle; and
  a cover configured for covering the pit, wherein the cover comprises a number of cover elements, wherein an individual cover element extends in a width direction of the pit, and wherein the cover elements are configured to move between a pit covering state and a lift moving state such that the one or more moveable lifts pass over and/or by the cover elements, wherein the cover elements move when one of the one or more moveable lifts moving through the pit is approaching.

The invention relates to so-called in-ground lifting systems having a support structure that is configured for mounting the lifts in a pit. Such pit is preferably provided in a workshop to enable lifting vehicles for maintenance and/or repair. The lifting system according to the invention comprises one or more moveable lifts that are capable of moving in the pit. In some embodiments of the invention only a number of moveable lifts are provided. In other embodiments of the invention one or more stationary lifts/lifting devices are provided in addition to the moveable lift(s).

The use of at least one moveable lift enables handling different wheelbases of a vehicle to be lifted. The pit extends over a certain length, thereby enabling lifting vehicles in a wide range of vehicle dimensions. The moveable lift(s) is/are moved with a moving drive that is configured for moving the one or more lift(s) in the pit. The lifting system further comprises a lifting drive that is configured for raising and/or lowering one lift and/or a number of lifts. The lifting and/or moving drive(s) may comprise an electric, hydraulic and/or pneumatic drive system that operates on an individual lift and/or on a number of lifts. An example of such lifting and/or moving drive is illustrated in the aforementioned WO 2015/108414 A1.

According to the invention the pit is provided with a pit cover such that the pit remains covered during the operation, and preferably also remains covered during a translational movement of one or more of the moveable lifts. The cover comprises a number of cover elements, wherein an individual cover element extends in a width direction of the pit. The cover elements are configured to move between a pit covering state and a lift moving state.

In the pit covering state the cover elements cover the pit to provide a safe working environment. In the lift moving state the cover elements are moved and positioned such that the one or more moveable lift pass over and/or by the cover elements, wherein the cover elements move when one of the one or more moveable lifts moving through the pit is actually approaching. Due to the movement of the cover elements the moving lift is capable of passing over or by the cover elements in its close vicinity. This moving of the cover elements may involve a rotating movement wherein the respective cover element rotates around a rotation axis, preferably on one of its sides, such that the moving lift passes by the respective cover element. Alternatively and/or in addition thereto, the moving of the cover elements may involve a lowering movement wherein the respective cover element is lowered into the pit such that the moving lift passes over the respective cover element.

Cover elements that are not in the vicinity of a moving lift remain in their covering position even while the moving lift moves in the pit in the lift moving state. More specifically, these cover elements remain in their position and do not move until the moving lift approaches these cover elements. This prevents unnecessary and/or undesired moving of cover elements, thereby contributing to maintaining a safe working environment also during the positioning of the moveable lift(s). This significantly improves safety in a workshop. In fact, by only moving the cover elements that are in the vicinity of the moving lift an effective cover can be provided that is also cost effective.

Preferably, the cover is suitable for use in different types of in-ground lifting systems, including systems with piston-type and/or scissor-type lifts. Also, the cover can be used in existing, conventional lifting systems, therein replacing its conventional cover to improve safety of the in-ground lifting system. More preferably, the cover is provided as a modular system to improve its implementation in existing in-ground lifting systems.

In addition to an improved (workshop) safety, the cover also contributes to a more flexible in-ground lifting system. For example, one or more moveable lifts can be added or removed from the pit without the need of making significant amendments to the cover. Also, when enlarging the pit and pit structure the cover can also be enlarged relatively easily by adding a number of cover elements.

The in-ground lifting system of the invention preferably comprises a system controller that is configured for controlling the one or more lifts, preferably including moving of the moveable lifts and also the lifting movements of the lifts. Optionally, the system controller is capable of defining at least one set of lifts from the available lifts for lifting the vehicle. This enables defining a set of lifts for a specific vehicle, typically depending on the number of wheel axles. This system controller provides flexibility in defining sets of lifts. For example, in a pit having a length of 35 meters extending over the workshop floor six moveable lifts can be provided. The system controller may define a set of lifts having two lifts for lifting a small vehicle, and more lifts in one set for a larger vehicle. The other lifts in the pit may be put at rest and/or can be used for other tasks. This contributes to a flexible in-ground lifting system.

In a preferred embodiment of the invention, the cover further comprises a release mechanism that is configured for allowing the cover elements to move from a pit covering state, wherein the cover elements cover the pit, to a lift moving state, wherein the cover elements are positioned to allow the moveable lift to pass.

Providing a release mechanism enables moving the cover elements in the vicinity of a moving lift, such that the moving lift may pass over and/or by the cover elements. During the movement of a cover element to a lift moving state the respective cover element is preferably moved substantially into the pit. This contributes to improving the overall safety of the lifting system.

Preferably, the release mechanism comprises a moveable support element.

Providing a moveable support element results in an effective release mechanism. Moving the support element initiates a cover element to move from the pit covering state to the lift moving state. In addition, the use of a moveable support element provides a cost effective release mechanism with minimal complexity. Also, the use of moveable support elements for the cover elements improves easy maintenance of the cover.

The moveable support element can be provided in different embodiments, including providing the support element as a moveable pen, pawl, lip that can be retracted to initiate the desired movement of the cover element, for example. The moveable support element can be provided in or at the cover element and/or the pit structure.

In a presently preferred embodiment of the invention the release mechanism further comprises a spring element. Such spring element maintains the moveable support element in its (default) position, wherein the cover element is preferably kept in its pit covering state. This provides a safe cover that increases workshop safety.

In one of the presently preferred embodiments of the invention the moveable support elements are included in and/or attached to the cover elements.

Including and/or attaching the moveable support elements to the cover elements provides a modular system. Preferably, a spring or spring-like element keeps the individual support element in a position that keeps the respective cover element in a pit covering state. When a moving lift approaches an individual cover element the support element of this cover element is moved, optionally against its spring force, to enable movement of the respective cover element. In such embodiment the moveable support elements are preferably retracted into and/or below the respective cover element. This has the advantage that the pit structure can be kept relatively simple and/or with minimal dimensions that reduces the requirements for the pit suitable for the lifting system. This reduces the complexity and costs for the pit.

Alternatively and/or in addition thereto, the moveable support elements are provided in and/or attached to the pit.

Including and/or attaching the moveable support elements to the pit, preferably to the pit structure, provides less complex cover elements. In such embodiment the moveable support elements are preferably retracted into the pit and/or pit structure. This may improve the robustness of the lifting system.

It will be understood that the movement of the moveable support elements in the lifting system of the present invention can be performed in different ways.

In some embodiments of the invention, the moveable support elements are provided with a rotation axis that extends in a substantially horizontal direction. This enables rotation of the support element in a preferred downward direction, thereby initiating movement of the respective cover element from the pit covering state to the lift moving state.

In other embodiments of the invention, the moveable support elements are provided with a rotation axis that extends in a substantially vertical direction. This enables rotation of the support element in a direction that is substantially parallel to the workshop floor and preferably similar to the moving direction of the approaching moveable lift, thereby initiating movement of the respective cover element from the pit cover state to the lift moving state.

In a further preferred embodiment of the invention, the cover elements are provided with a cover element rotation axis that extends in a substantially horizontal direction at or close to one of the ends of the cover element.

Providing the cover elements with an individual cover element rotation axis at or close to one of the ends of the respective cover element enables a direct rotation of the cover element, preferably inwards into the pit, to enable the moving lift to pass by the cover element.

In another preferred embodiment of the present invention, the cover further comprises a support system configured for supporting the cover elements.

When providing a support system the cover elements can be provided cost effective as loads will be substantially carried by the separate support system. Such support system may involve a construction of rods and/or beams that are moveable in response to movement of a moveable lift. In one of the presently preferred embodiments the support system comprises a harmonica-type structure wherein individual carrying rods and/or beams are moveable relative to each other.

In a further embodiment of the present invention, the in-ground lifting system further comprises a charging system.

A charging system provides the energy that is required for moving the lifting device and/or lifting a vehicle therewith. In one of the presently preferred embodiments the energy system comprises a regenerative energy system that is configured for charging the energy system when lowering the vehicle. This contributes to an effective use of the energy.

In another presently preferred embodiment the energy system comprises a wireless charging system. Such wireless charging system obviates the use of charging cables in the pit. This wireless charging preferably relates to inductive charging using an electro-magnetic field to transfer energy, thereby enabling charging a battery of the lifting device. Alternatives that can also be used as an alternative to, or in combination with, inductive charging relate to conductive wireless charging that use a conductor to connect to electronic devices for the transfer of energy and charging of the battery. Other possibilities include wireless power transfer using an inductive charging pod as an example of inductive charging. It will be understood that different charging types can also be used in combination effectively, for example a type of inductive charging in combination with regenerative charging. It will also be understood that other possibilities can be used as an alternative or in combination therewith, such as the use of solar energy.

The charging system preferably enables charging in a safe manner, more specifically in a sealed system that is preferably also Atex proof to improve the overall safety in the workshop. In one of the presently preferred embodiments the energy system comprises a continuous charging system that enables charging at every location wherein one of the moveable lifts is positioned. This provides an effective possibility of charging such that the moveable lift has an optimal availability for the lifting of vehicles.

In a further embodiment of the present invention, the in-ground lifting system further comprises two or more sets of lifts, wherein each set is configured for lifting a vehicle.

The lifts can be selected in different ways, for example using a card, RFID, touchscreen, finger print etc. It will be understood that other selecting means can also be envisaged in accordance to the present invention. In a presently preferred embodiment, a user selects the required lifts and the control system activates these selected lifts as a set, preferably associated with a specific (lifting) job. Then, the set is ready to be used by the user.

In a presently preferred embodiment of the invention, the system controller is configured for defining two or more sets of lifts in a single in-ground lifting system. This enables the in-ground lifting system to be used for working on two or more vehicles simultaneously. This enables an efficient use of the space of the workshop floor that is used by the in-ground lifting system. For example, a single large truck, bus or train can be lifted with the in-ground lifting system, or two or more different vehicles can be lifted by the in-ground lifting system simultaneously. It will be understood that the number of vehicles depends on vehicle type and also on the available pit length and number of lifts therein. With the effective use of the in-ground lifting system of the invention a pit can be provided over the entire length of the workshop floor, or at least a substantial part thereof. This provides maximum flexibility for lifting one or more vehicles.

Preferably, the system controller of the in-ground lifting system is configured for defining and also controlling the different sets of lifts. This controlling enables lifting multiple vehicles simultaneously with the system controller. This provides an efficient in-ground lifting system, wherein the system controller of such system is configured for lifting multiple vehicles. For example, a user that needs lifting a specific vehicle uses the system controller for defining the set of lifts that are selected from the available lifts of the in-ground lifting system. Then, the system controller enables this specific user to control his or her specific set of lifts to do the job. Optionally, the same or another user may select a further set of lifts from the available lifts to perform another job on another vehicle. This provides an effective use of the workshop floor with the in-ground lifting system of the invention.

The invention further relates to a method for lifting a vehicle, the method comprising the steps of:
providing an in-ground lifting system according to an embodiment of the invention;
positioning at least one of the one or more moveable lifts; and
lifting the vehicle.
Such method provides similar advantages and effects as mentioned in relation to the in-ground lifting system.

BRIEF DESCRIPTION OF THE DRAWINGS

Further advantages, features and details of the invention will be elucidated on the basis of preferred embodiments thereof, wherein reference is made to the accompanying drawings, in which:

FIGS. 1C-D show lifting of a truck;

FIGS. 3A-C show an alternative cover embodiment comprising a self-supporting cover and a release mechanism;

FIGS. 4A-B show an alternative cover embodiment comprising a release mechanism in the pit structure;

FIG. 6 shows an alternative cover embodiment comprising a release mechanism with a substantially vertical rotation axis;

FIG. 9 shows an alternative cover embodiment comprising an alternative tilting release mechanism; and FIGS. 10A-B show an alternative cover embodiment comprising a sliding release mechanism.

DESCRIPTION OF THE INVENTION

The following description is merely exemplary in nature and is in no way intended to limit the invention, its application, or uses. While the disclosure is described as having exemplary attributes and applications, the present disclosure can be further modified. This application is therefore intended to cover any variations, users, or annotations of the disclosure using its general principles. Further, this application is intended to cover such departures from the present disclosure as commonly known or customary practice of the skilled in the art to which this disclosure pertains and which fall within the limits of the appended claims. Accordingly, the following description of certain embodiments and examples should be considered merely exemplary and not in any way limiting.

The lifting system of the present invention is suitable for use with lifting systems comprising any number of lifts, including without limitation piston type and scissor type lifts and systems having one, two, four or another number of suitable lifts. The lifts may achieve lifting and lowering capability by means known to those of skill in the art, including hydraulically, electrically, mechanically, and electromechanically. Lifting systems compatible with the present lifting system may be stationary and/or permanently affixed or attached to a certain location or may be mobile, or capable of being transported. With reference to the figures, alike element numbers refer to the same element between drawings.

Figure 1A:
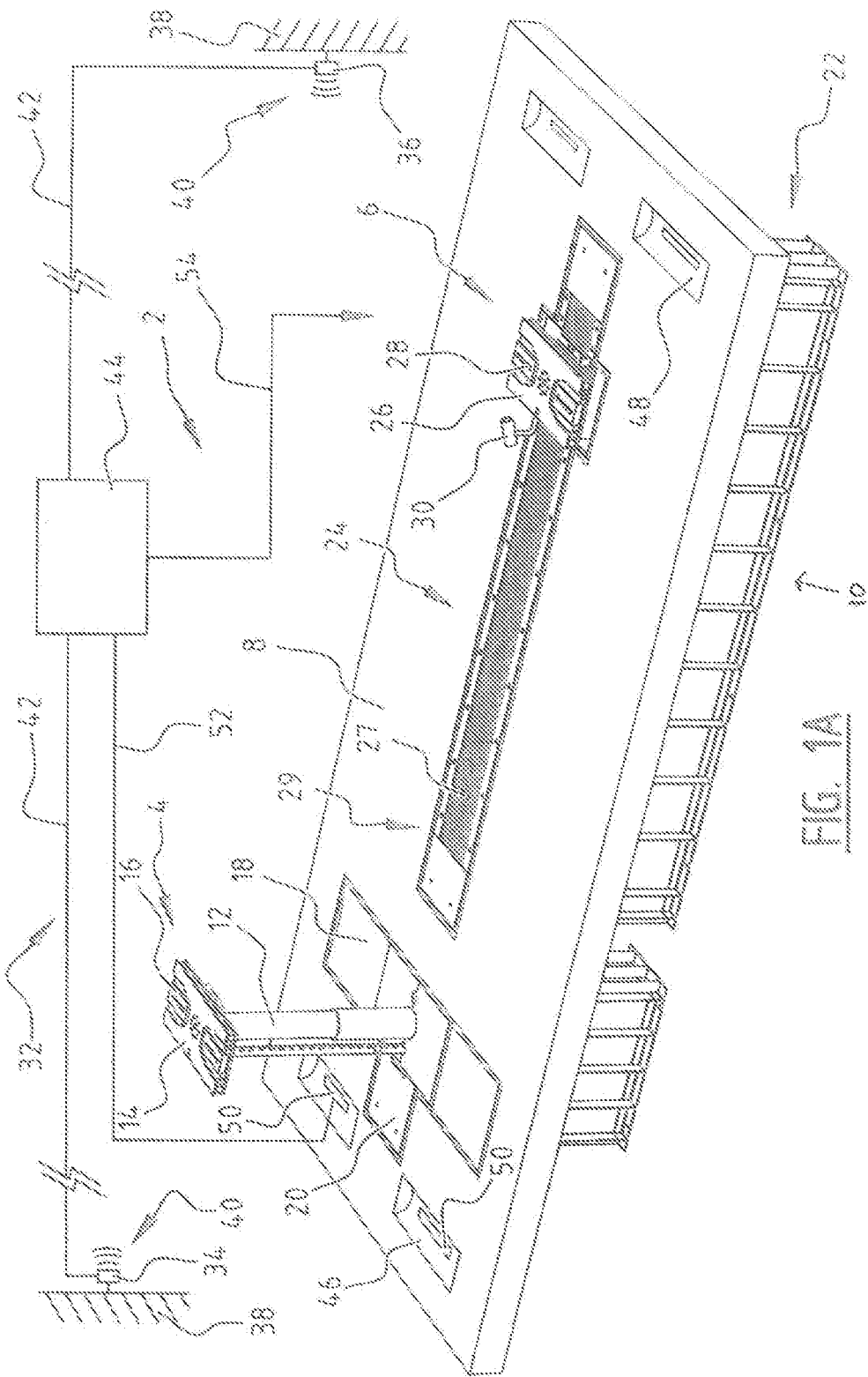
FIG. 1A shows an in-ground lifting system of the invention.
Figure 1B:
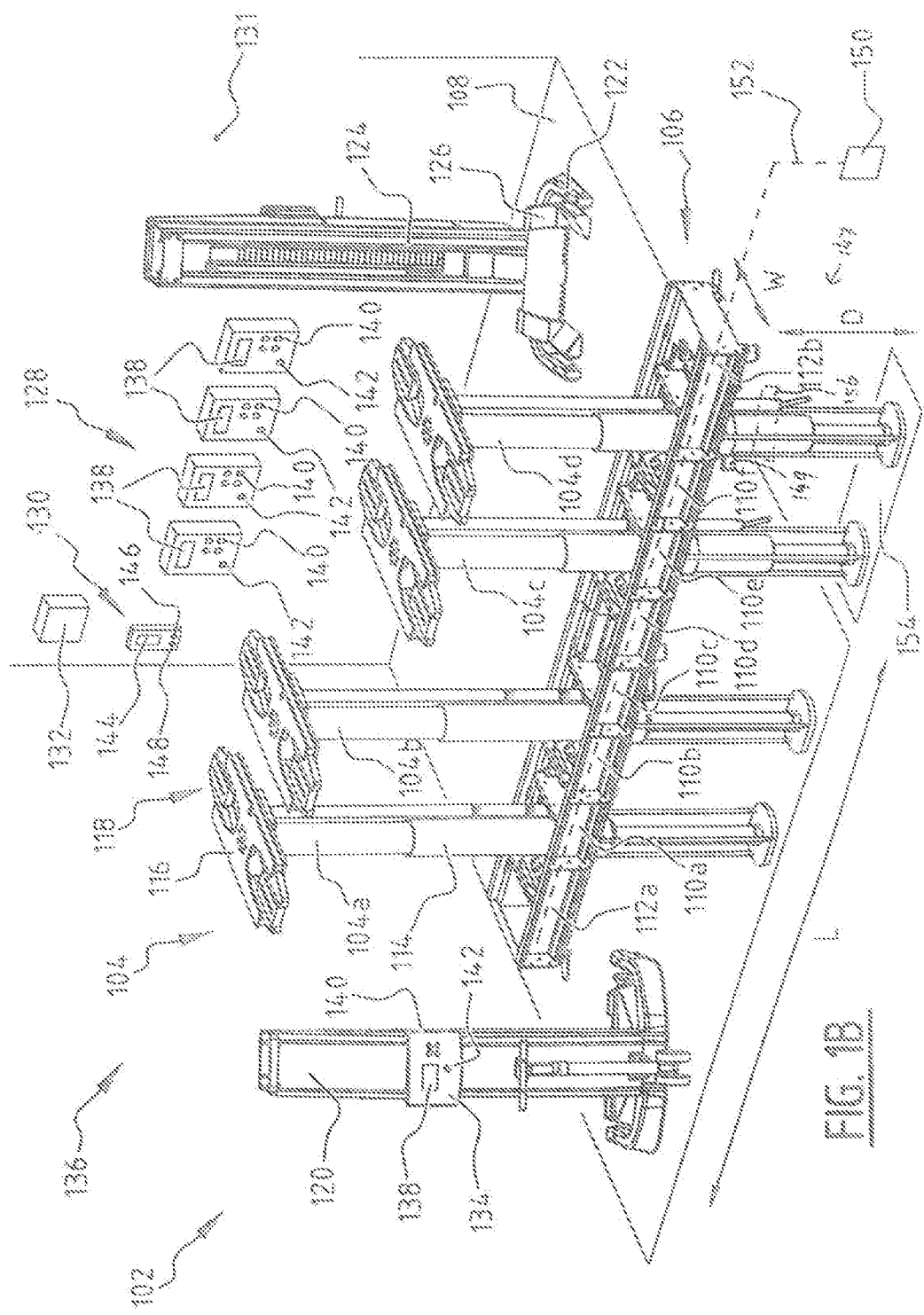
FIG. 1B shows an in-ground lifting system with multiple moveable lifts.

First, different lifting systems will be illustrated that are provided with moveable lifts only (FIG. 1B) or with a stationary lift (FIG. 1A). It will be understood that other embodiments of lifting systems in accordance with the invention can also be envisaged. Then, different embodiments of covers will be illustrated that can be applied to different lifting systems. Also here it will be understood that other embodiments, including combinations of illustrated embodiments can be envisaged in accordance with the present invention.

Lifting system 2 (FIG. 1A) comprises stationary lift 4 and moveable lift 6 that are both positioned in a pit in (workshop) floor 8. Stationary lift 4 is provided with telescopic lifting cylinder 12 including a lifting drive. On top of cylinder 12 there is provided carrier 14 with axle carriers 16. In the illustrated embodiment wheel edges or wheel recesses 18 are provided. Recesses 18 define the position of the front wheels of the vehicle. Furthermore, in the illustrated embodiment hatch 20 is provided in front of the front lifting column 4, with hatch 20 enabling maintenance, for example.

Moveable lift 6 moves in pit 10 that is provided with pit structure 22 that comprises a cassette or box. Pit structure 22 provides pit 10 with opening 24 for guiding moveable lift 6. Moveable lift 6 is provided with carrier 26 whereon axle carriers 28 are mounted. Depending on the type of vehicle additional adapters can be provided that cooperate with carriers 14, 26 to enable engagement with different axle dimensions.

Cover 27 is configured to cover pit 10. Cover movement system 29 moves cover 27 with its elements between the pit covering state and the moving lift state, wherein moveable lift 6 moves in pit 10 with pit structure 22 by a moving drive. Optionally, moveable lift 6 is provided with camera 30 that enables a safety check when system 2 is about to lift the vehicle and allows the operator to additionally check the correct engagement of carrier 26 on the axle of the vehicle. In the illustrated embodiment, using lifting system 2 enables positioning the moveable lifting column 6 with an accuracy of at least 2.5 cm and preferably within the range of about 1.25 cm.

Further details of conventional parts of system 2 are disclosed in WO 2006/112857 which is included by reference herein. WO 2006/112857 specifically discloses a scissor type lifting device that is positioned in a pit. This pit with a pit cover and lifting means further involves auxiliary adapters engaging the axle of the vehicle has been described in detail herein.

In the illustrated embodiment lift system 2 comprises optional wheel base measuring system 32 comprises sensors 34, 36. In the illustrated embodiment sensors 34, 36 are positioned on or against wall 38 to provide a stable reference point for the measurement. Sensors 34, 36 provide signal 40 when performing a distance measurement. Signal 40 may use infrared, ultrasound and/or another signal. The use of such signal 40 prevents physical contact between sensors 34, 36 and the wheels or axles of the vehicle. Measurement signal 42 is provided to controller 44. Controller 44 steers the required sensor activities and performs the desired calculations. Controller 44 starts a measurement when a wheel of the vehicle is in recess 46, 48. Recesses 46, 48 can be provided with a sensor 50, for example a load sensor. Sensor 50 provides a measurement signal 52 to controller 44 indicative of the presence of a wheel in recess 46, 48. Controller 44 may optionally also control cover drive of cover movement system 29 for driving cover 27 by providing steering command 54 to cover drive of cover movement system 29. Optionally, recess 46 can be combined with wheel recesses 18 to provide one recess adjacent to stationary lift 4. It will be understood that one recess 46, 48 will suffice for the wheel base measuring system 32 included in lifting system 2. In one of the preferred embodiments recess 46 is combined with wheel recess 18 such that no additional recesses are required.

In-ground lifting system 102 (FIG. 1B with the cover not being shown for illustrative purposes) comprises a number of moveable lifts 104. In the illustrated embodiment four moveable lifts 104*a, b, c, d* are provided in pit 106 that is provided in workshop floor 108. Furthermore, in the illustrated embodiment pit 106 comprises a number of modular intermediate pit structures 110*a, b, c, d, e, f*. End structures 112*a, b* are provided at the end of pit 106. It will be understood that end structures 112*a, b* can be similar to the intermediate structures 110*a-f*. Moveable lifts 104 comprise a piston 114 and carrier 116 with axle carriers 118. Pit 106 is provided with length L, depth D, width W.

In the illustrated embodiment lifting system 102 optionally also comprises mobile lifting columns 120 having foot 122, mast 124 and carrier 126.

In the illustrated embodiment, lifting system 102 is provided with a number of local controllers 128 that are provided at wall 131 and are associated with individual lifts 104*a-d*. Alternatively, local controllers 128 are attached to moveable lifts 104*a-d* and/or are also moveable. In the illustrated embodiment remote control 130 is provided. Optionally, transmitter 132 is located in the workshop to enable wireless communication between the individual components of system 102. Mobile lifting columns 120 can be provided with separate local controller 134. System controller 136 may comprise one or more of local controllers 128, 134 and/or may optionally comprise remote controller 130 and/or may use transmitter 132 that can also act as a central control unit with a remote input device such as remote controller 130. Optionally, individual local controllers 128, 134 can be used as a master or central controller. System controller 136 and/or one of its components 128, 130, 132, 134 steers moving drive(s) and lifting drive(s) of lifting system 102. It will be understood that different control configurations can be applied in system 102 of the invention. Local controllers 128, 134 comprise display 138 and a number of buttons 140. Also, in the illustrated embodiment identification device 142 is provided enabling a user to identify himself or herself to the system controller 136 and/or one of its components 128, 130, 132, 134. Also, remote control 30 can be provided with display 144, button 146 and identification means 148. It will be understood that identification means 148 may also use button(s) 146 for entry of a pin-code. Optionally display 138, 144 can be used for fingerprint scanning or other appropriate manners to enable identification, for example.

In a presently preferred embodiment energy system 147 comprises regenerative energy system 149 that regenerates energy when lowering carrier. This may involve redirecting the hydraulic fluid in a regeneration loop. Energy system 147 may also comprise an inductive charging system. As an alternative, or in addition thereto, charging plate 154 can be provided in the bottom of pit 106. Other charging means may comprise charging cables 152 and/or wireless conductive charging system 156.

Figure 1E:
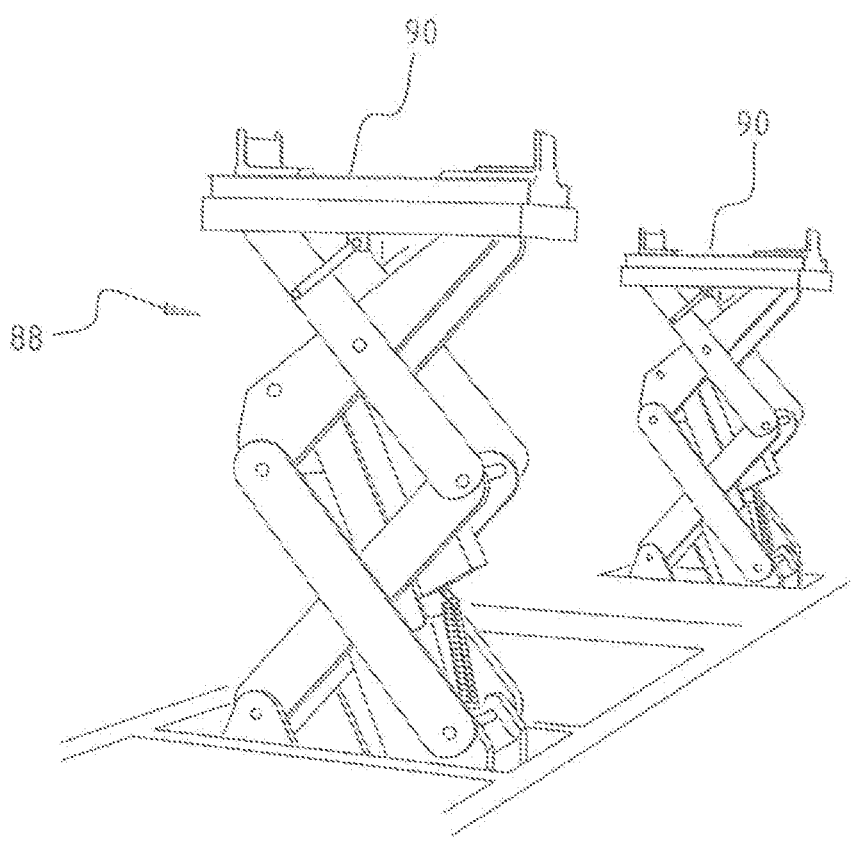
FIG. 1E shows a scissor type lift.

In-ground lifting system 2,102 may comprise multiple sets of lifts 4,6,104 (FIGS. 1C,D). For example, a first set with moveable lifts 104*a,b* are configured for lifting truck 78. Optionally, a second set with moveable lifts 104*c, d* can be used to lift another truck 78 or passenger car. It will be understood that another number of sets and/or different types of vehicles can also be provided. Furthermore, it will be understood that an individual set may comprises any number of lifts 4, 104 and 6,104, optionally including mobile lifting columns 120. An individual set can be controlled with local controller 138 optionally using central transmitter 132. Although moveable lifts 4,104 are illustrated as piston-type lifts 4,104, it will be understood that as an alternative also scissor type lifts 88 can be used (FIG. 1E).

Figure 2:
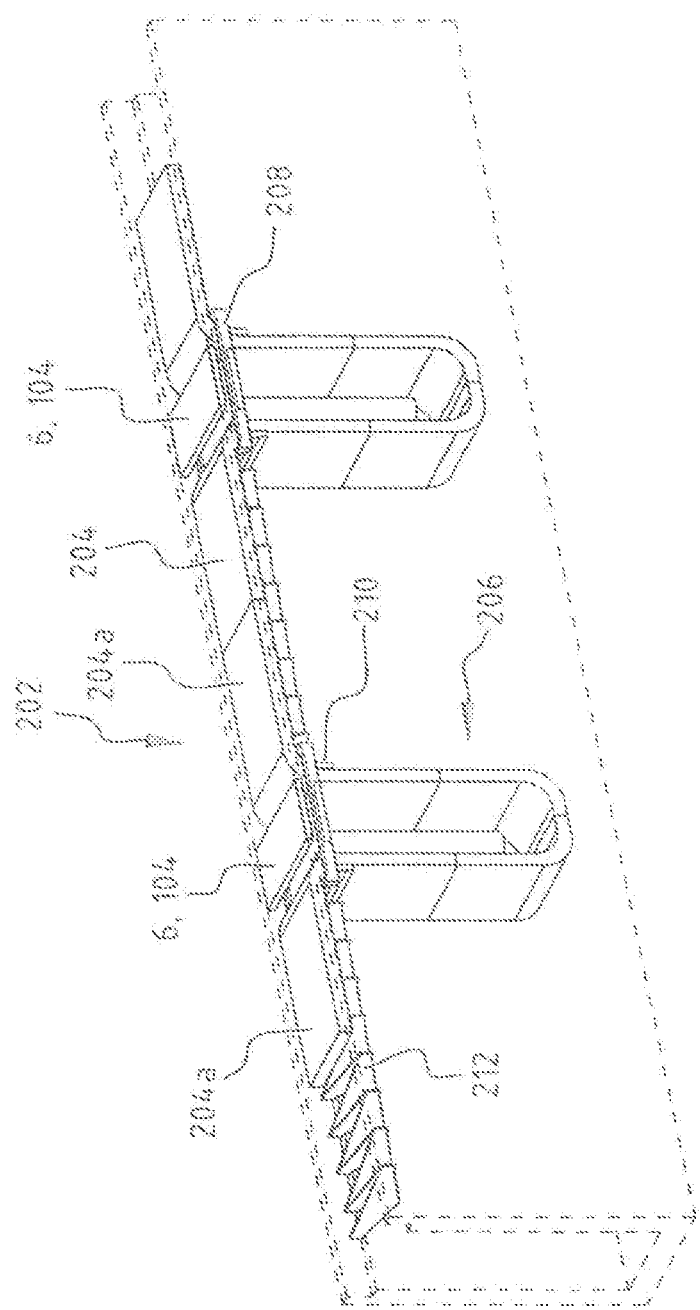
FIG. 2 shows a cover embodiment comprising a continuous cover with a harmonica support.

Cover system 202 (FIG. 2) comprises cover 204 with cover elements 204*a*. Cover 204 covers a lifting system comprising moveable lifts 6, 104. Cover 204 is a cover extending over the length of a pit, with cover 204 having loop(s) 206 for individual lifts 6, 104. Lifts 6, 104 move with moving structure 208. Moving structures is provided with push rod 208 that engages cover support structure 212 having a harmonica-type structure. When moving lift 6, 106 push rod 208 engages cover support structure 212 and pushes adjacent cover elements 204*a* in the pit that become part of loop 206. On the other end of lift 6, 104 cover elements 204*a* are positioned from loop 206 back on cover support structure 212.

Figure 3B:
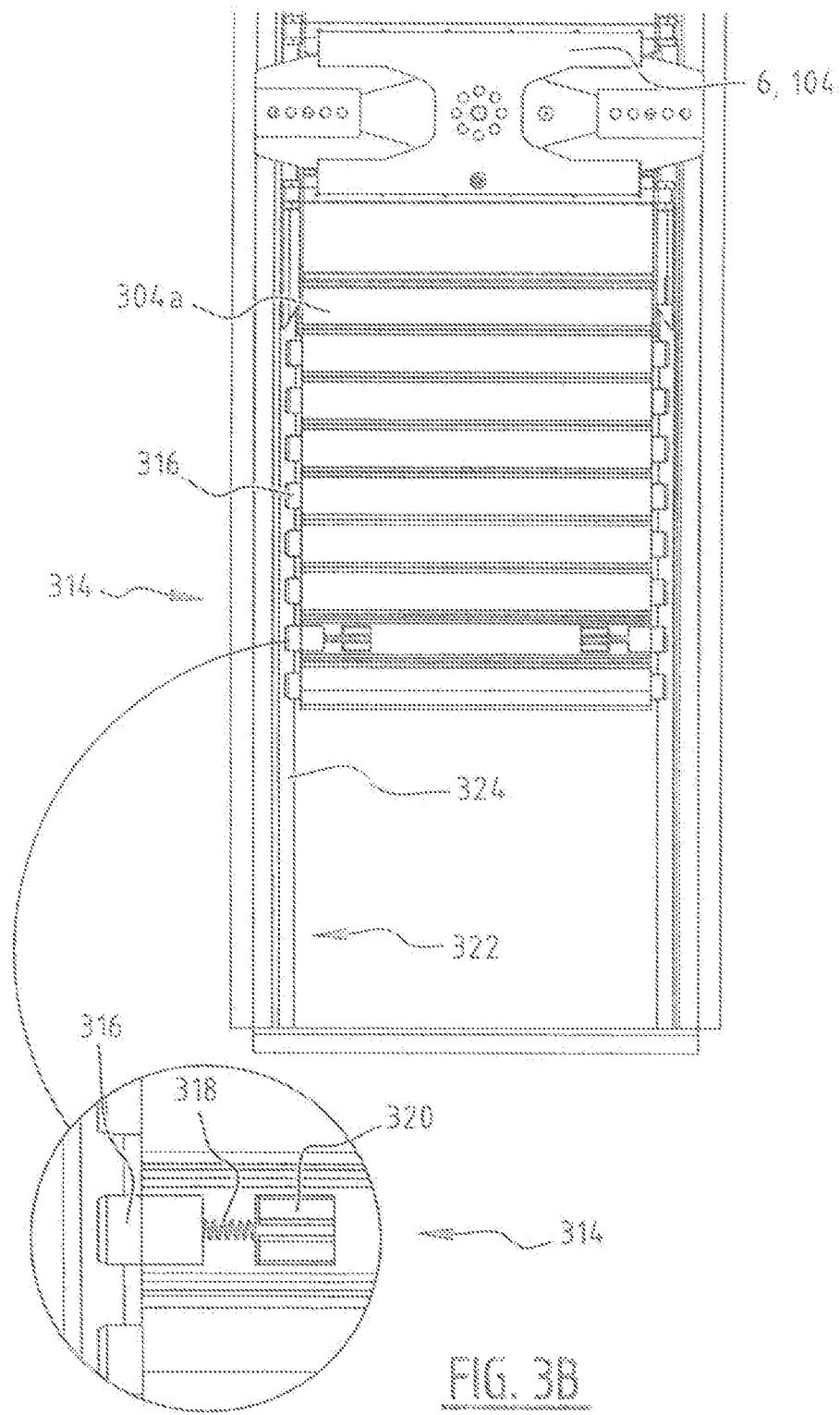
Figure 3C:
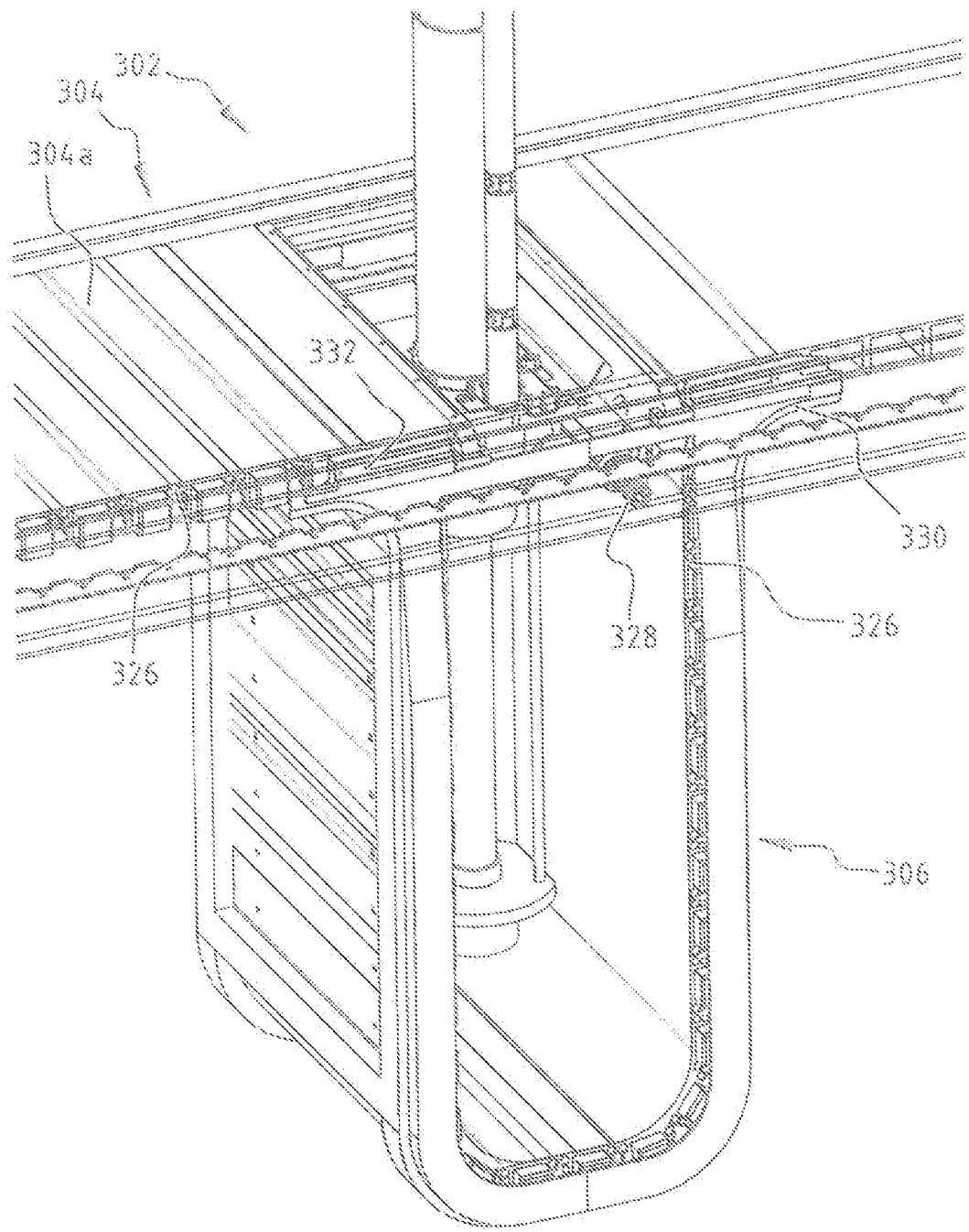

Cover system 302 (FIGS. 3A-C) shows an alternative cover embodiment comprising a self-supporting cover 304 with cover elements 304*a*. Cover 304 is provided with loops 306 at each lift 6, 104. Moving structure 308 moves with lift 6, 104 and guides movement of cover elements 304*a*. Cover 304 is configured to cover pit 310 having pit structure 312. Cover 304 is provided with release mechanism 314. Release mechanism 314 comprises support/cam 316. In the illustrated embodiment, in a pit covering state, support/cam 316 is pushed outwards by spring 318 against support 320. Support/cam 316 rests and optionally slides over support beam 322 that is provided with receiving groove 324 that is configured for receiving support/cam 316 and provides support to respective cover element 304*a*. Individual cover elements 304*a* are connected by connectors 326. Moving drive 328 is capable of moving lift 6, 104 in pit 310. Guide 330 of moving structure 308 is configured for guiding movement of cover elements 304*a*. Moving structure 308 further comprises releasing guide 332 to push inwards support/cam 316 when moving lift 6, 104. In fact, when moving lift 6, 104 in pit 310 releasing guide 332 advances and pushes inwards support/cam 316 of an adjacent cover element 304*a*. This releases cover element 304*a* from support beam 322 and moves cover element 304*a* in loop 306 so that lift 6, 104 advances. On the other end of lift 6, 104 cover elements 304*a* are positioned back on support beam 322 and spring 318 pushes cam/nock 316 outwards to enable support of cover element 304*a*.

Figure 4B:
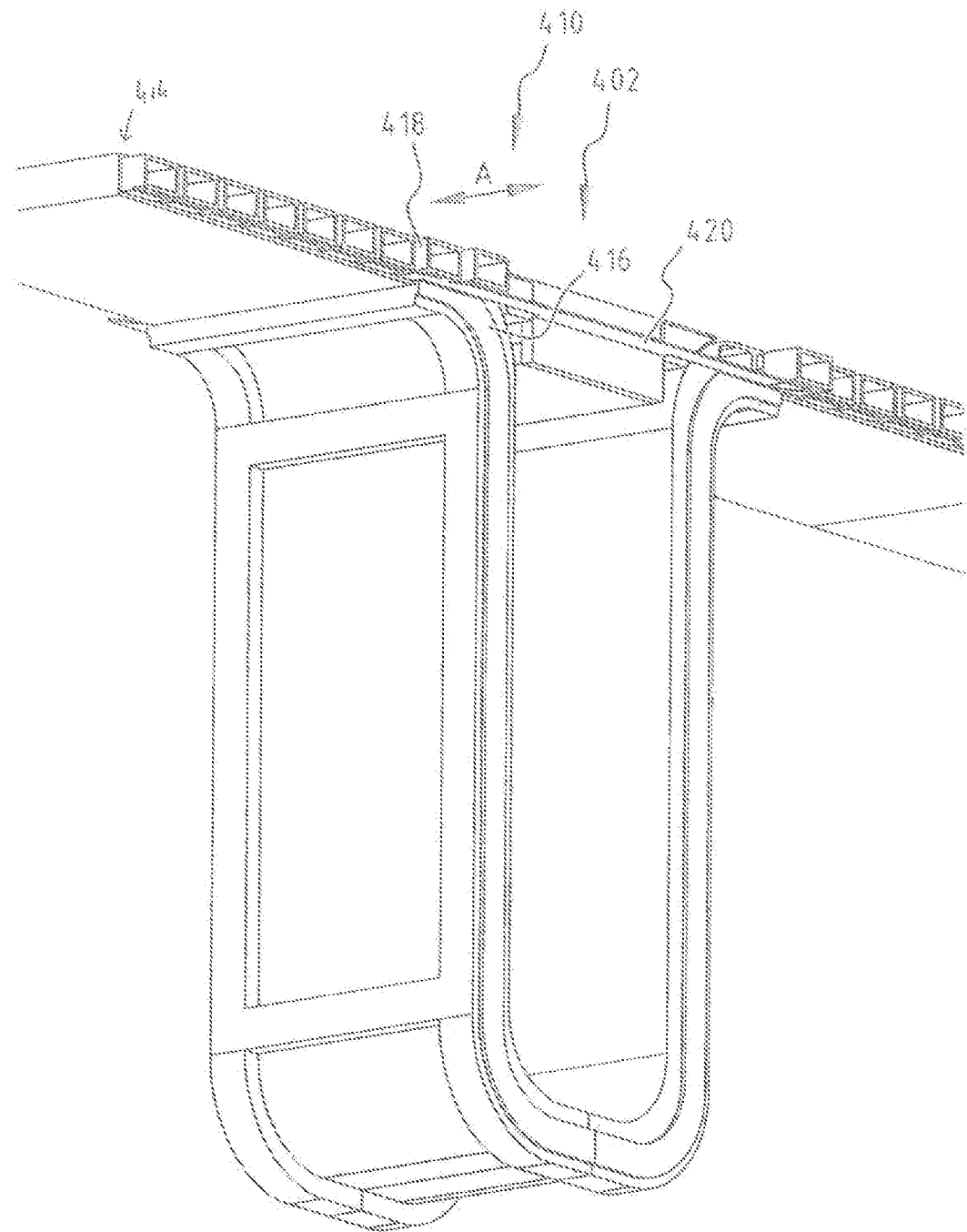

Cover system 402 (FIGS. 4A-B) shows an alternative cover embodiment comprising cover 404 with cover elements 404*a*. Cover 404 is provided with loops 406 at each lift 6, 104. Moving structure 408 moves with lift 6, 104 and guides movement of cover elements 404*a*. Cover 404 co-operates with pit structure 412. More specifically, cover 404 engages with release mechanism 410. In the illustrated embodiment, release mechanism 410 comprises nocks/cams 418 that are part of pit support structure 412 and that are capable of moving in recesses 414 of cover elements 404*a* to provide support for cover elements 404*a* in the pit covering state. Moving structure 408 is provided with guide 416 and releasing guide 420. When moving lift 6, 104 releasing guide 420 advances and pushes inwards support/cam 418 in direction A, preferably into pit structure 412, optionally against a spring element (not shown). This releases cover element 404*a* from support beam of pit structure 412 and moves cover element 404*a* in loop 406 so that lift 6, 104 advances. On the other end of lift 6, 104 cover elements 404*a* are positioned back on support beam of pit structure 412. Cam/nock 418 is moved outwards from pit structure 412 and enters recess 414 of cover element 404*a* to return it to its pit covering state.

Figure 5A:
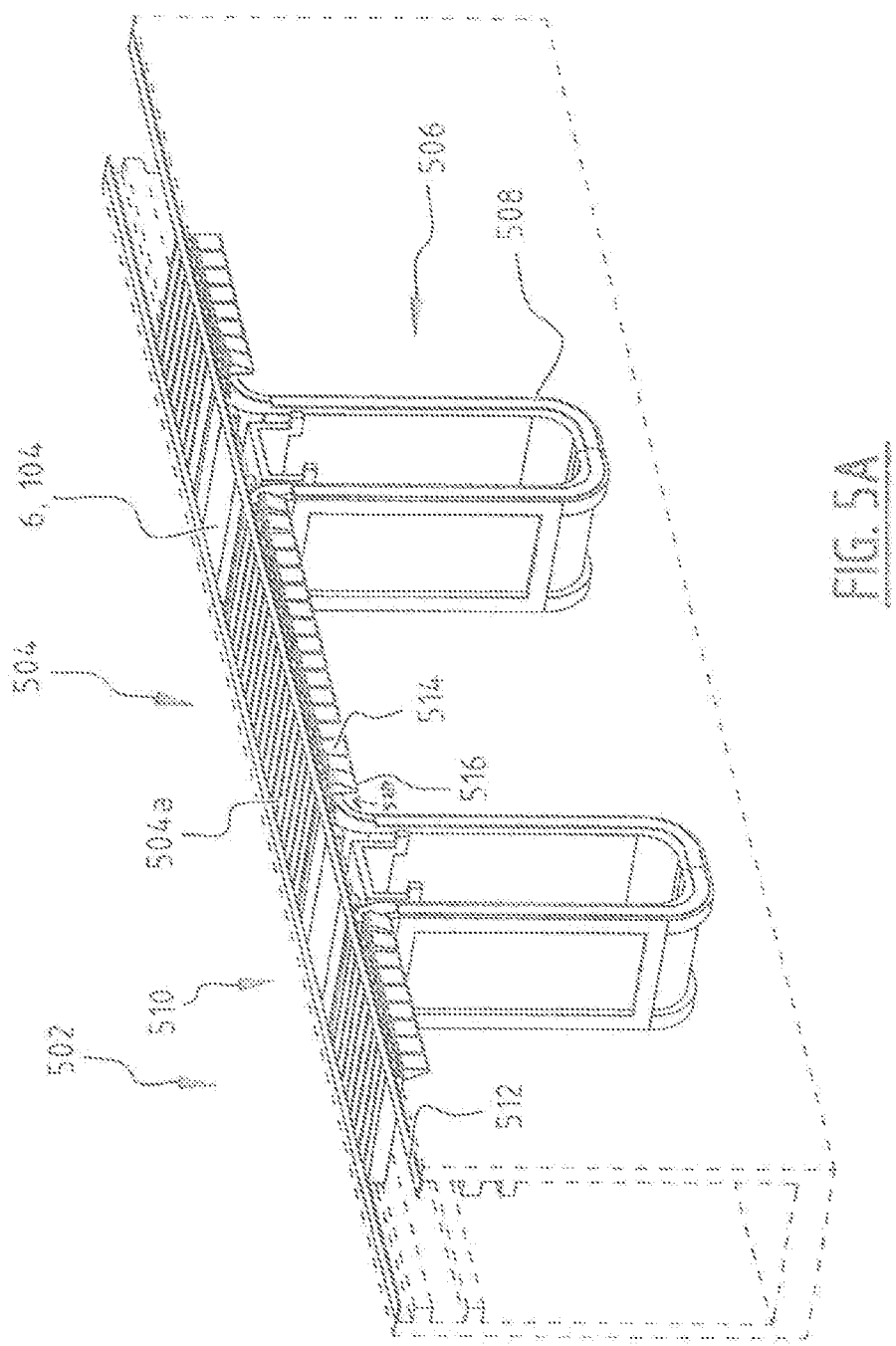
FIGS. 5A-B show an alternative cover embodiment comprising a release mechanism with a substantially horizontal rotation axis.
Figure 5B:
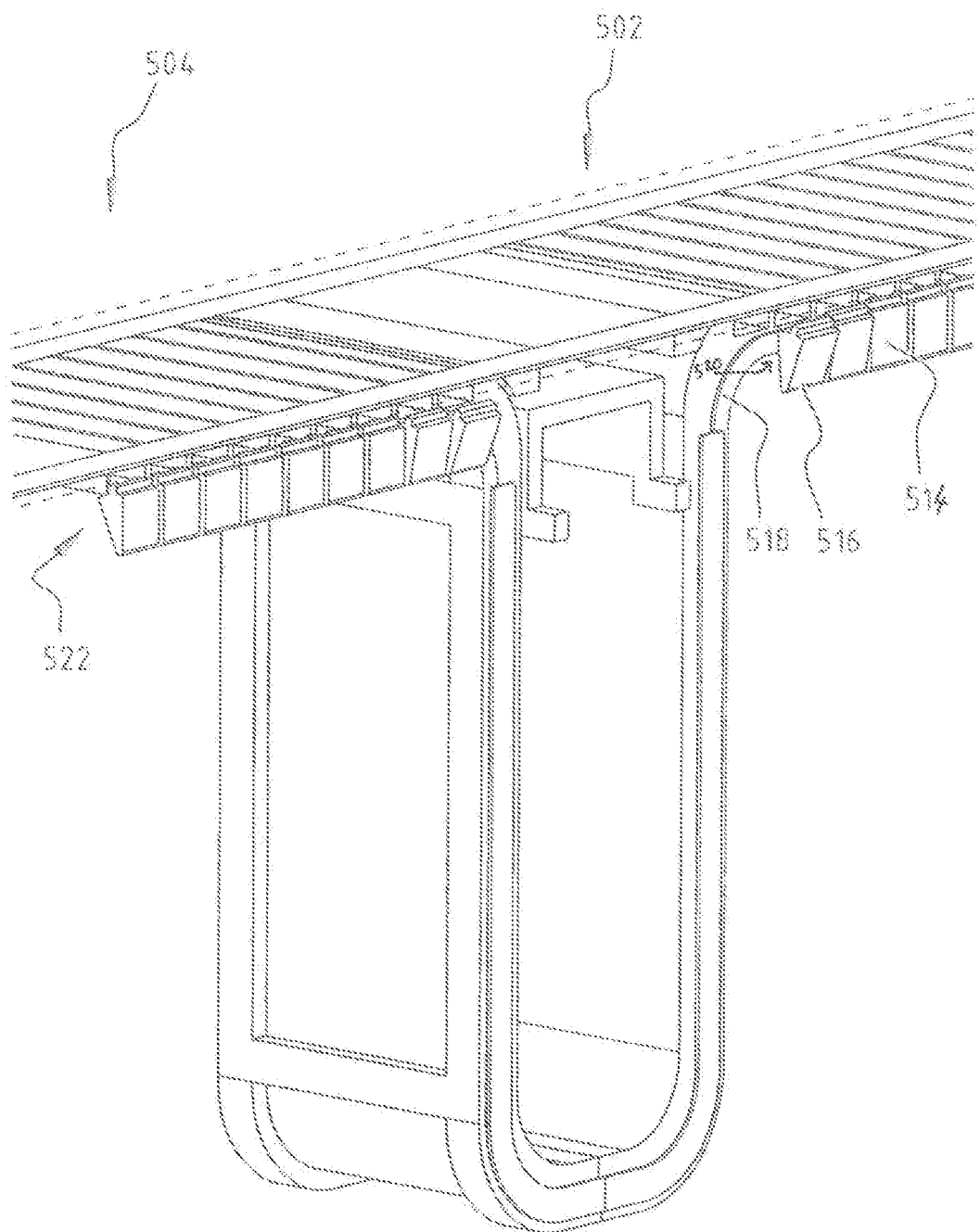

Cover system 502 (FIGS. 5A-B) shows an alternative cover embodiment comprising cover 504 with cover elements 504*a*. Cover 504 is provided with loops 506 at each lift 6, 104. Moving structure 508 moves with lift 6, 104 and guides movement of cover elements 504*a*. Cover 504 co-operates with pit structure 512. More specifically, cover 504 engages with release mechanism 510. Release mechanism 510 comprises support/cam 514 having a substantially horizontally extending rotation axis or shaft 516. Moving structure 508 is provided with guide 520 that moves nocks/cams 514 that are part of pit support structure 512. Nocks/cams 514 have a support surface 522 that engages an end of cover element 504*a* in the pit covering state. In the lift moving state nocks/cam 514 are moved away from cover element 504*a*. In the illustrated embodiment this movement involves a rotation around axis 516. When moving lift 6, 104 guide 520 advances and pushes inwards support/cam 514, optionally against a spring element (not shown). This releases cover element 504*a* from support surface 522 and moves cover element 504*a* in loop 506 so that lift 6, 104 advances. On the other end of lift 6, 104 cover elements 504*a* are positioned back on support surface 522.

Cover system 602 (FIG. 6) shows an alternative cover embodiment comprising cover 604. Similar to cover system 502 (FIGS. 5A-B), also cover system 602 (FIG. 6) comprises cover elements 604*a* and loops 606. Release mechanism 610 is provided in or on pit structure 612 having nocks/cams 618 that are provided with substantially vertically extending rotation axis or shaft 616 and support surface 614 that supports cover elements 604*a*. Guides 620 position release mechanism 610 when switching states. When moving lifts 6, 104 advancing guide 620 moves nocks/cams 618 into a releasing position such that the respective cover element 604*a* is moved into the pit. Rear guide 620 repositions nocks/cams 618 such that it supports cover element 604*a* that is repositioned from the pit to a pit covering position. Optionally moving nocks/cams 618 may involve the use of one or more spring elements (not shown).

Figure 7A:
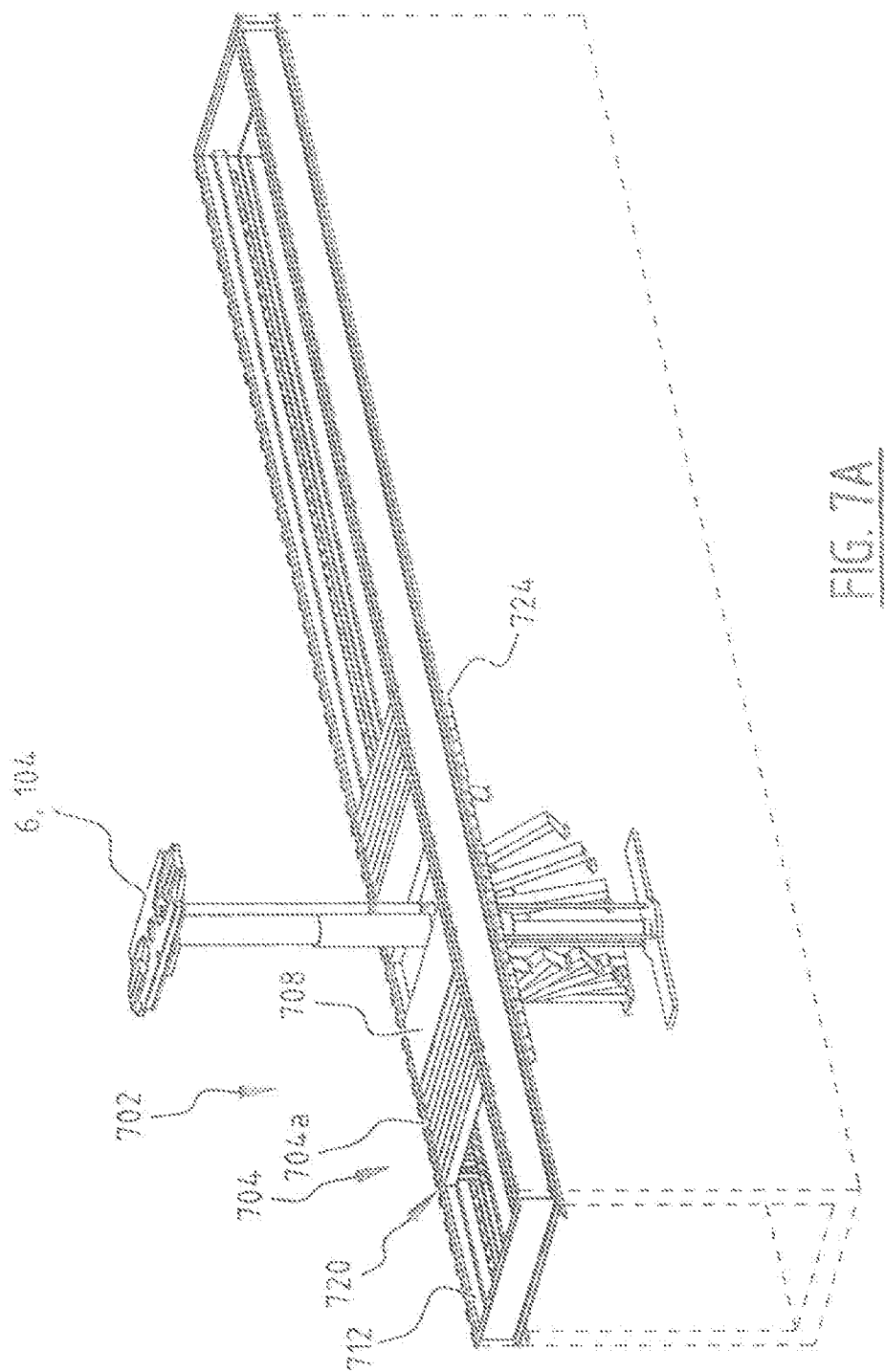
FIGS. 7A-B show an alternative cover embodiment comprising tilting cover elements.
Figure 7B:
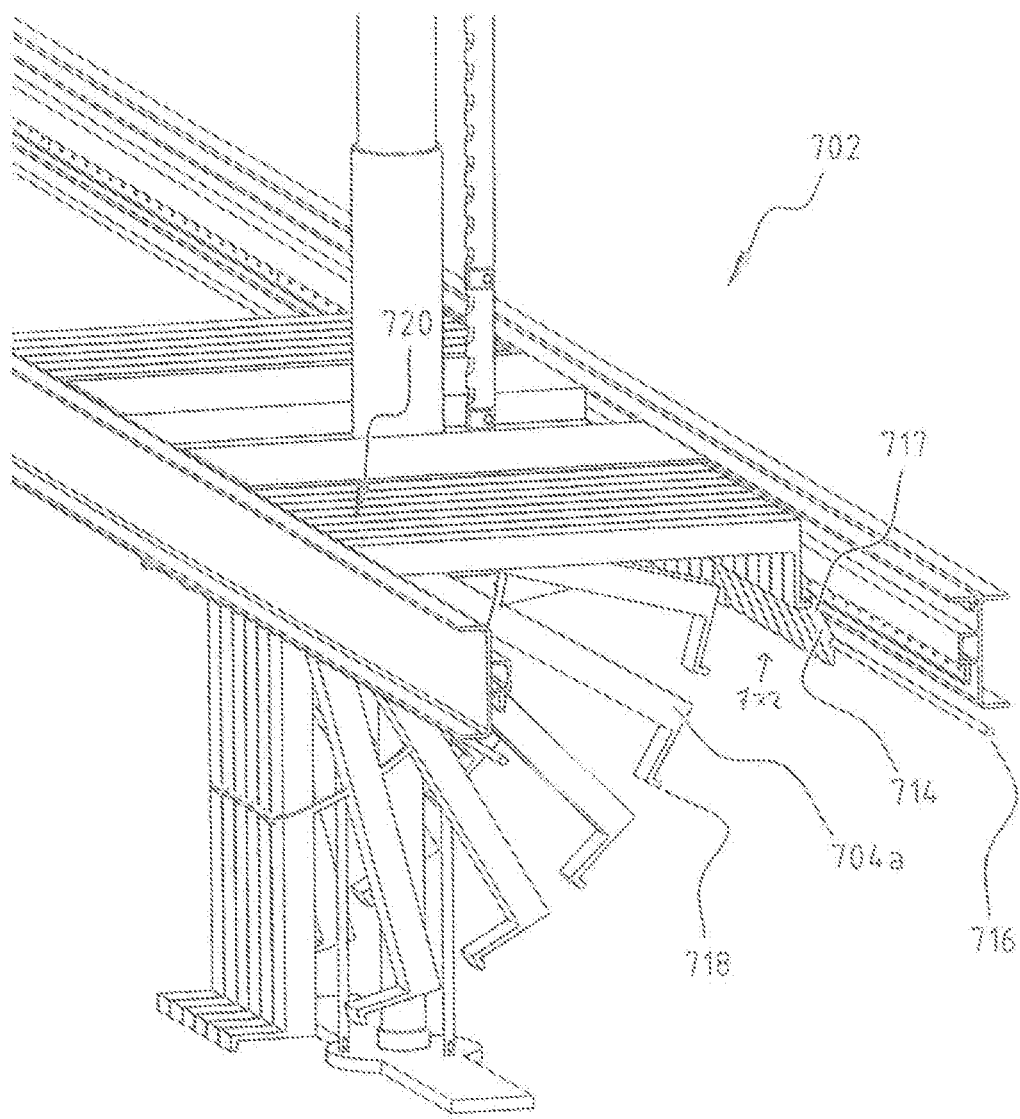

Cover system 702 (FIGS. 7A-B) shows an alternative cover embodiment comprising tilting cover 704 with tilting cover elements 704*a*. Lifts 6, 104 are provided in or with moving structure 708 that moves relative to pit structure 712. Cover element 704*a* is provided with connecting surface or edge 718 on at least one of its ends and with rotation axis or shaft 720 on its other end. Release mechanism 722 comprises connecting rod 714 that on one end is connected to rotation shaft 716 of pit structure 712, and on the opposite end is provided with support/cam 717 that engages connecting surface or edge 718 in the pit covering state. When moving lift 6, 104 guide 724 advances and pushes outwards support/cam 717, optionally against a spring element (not shown). This releases cover element 704a from support/cam 717 to enable tilting of cover element 704a so that lift 6, 104 advances. On the other (rear) end of lift 6, 104 cover elements 704a are positioned back on supports/cams 717.

Figure 8A:
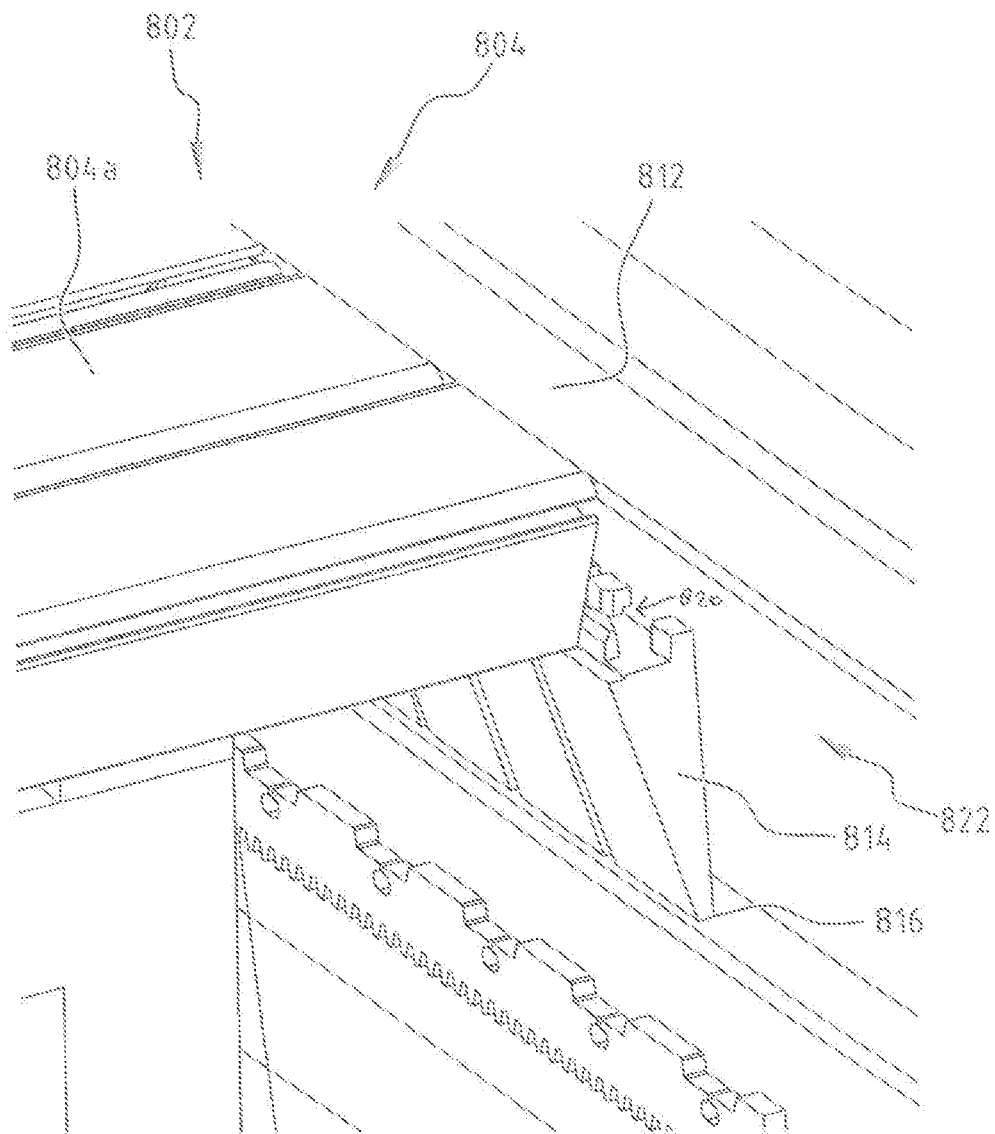
FIGS. 8A-B show an alternative cover embodiment comprising a tilting release mechanism.
Figure 8B:
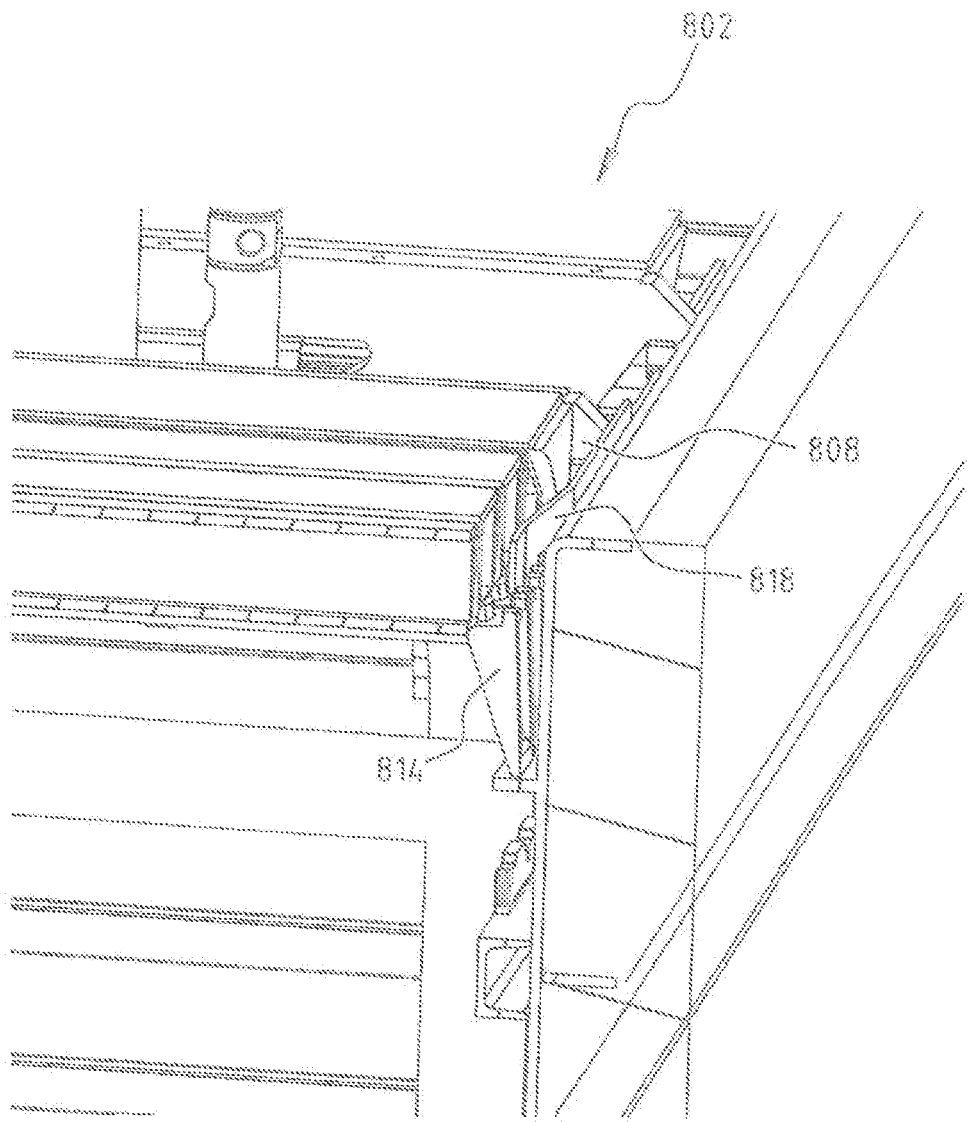

Cover system 802 (FIGS. 8A-B) shows an alternative cover embodiment comprising cover 804 with cover elements 804a. Lifts 6, 104 are provided in or with moving structure 808 having guide 818 that moves relative to pit structure 812. Release mechanism 822 comprises supporting element 814 that on one end is connected to rotation shaft 816 of pit structure 812, and on the opposite end is provided with support/cam 820. In the pit covering state, cover element 804a rests with its outer surface on support/cam 820. When moving lift 6, 104 guide 818 advances and pushes outwards support/cam 820 around rotation shaft 816, optionally against a spring element (not shown). This releases cover element 804a from support/cam 820 to enable moving cover element 804a so that lift 6, 104 advances. On the other (rear) end of lift 6, 104 cover elements 804a are positioned back on supports/cams 820.

Also cover system 902 (FIG. 9) shows an alternative cover embodiment comprising cover 904 with cover elements 904a. Cover elements 904 not covering the pit are positioned in loop 906. Lifts 6, 104 are provided in or with moving structure 908 that moves relative to pit structure 912 with guide 909. Release mechanism 920 comprises supporting nocks/cams 914 that may rotate around rotations axis or shaft 916 and in the pit covering state with one end is connected to pit structure 912 to support cover element 904a. When moving lift 6, 104 guide 909 advances and pushes outwards support/cam 914 around rotation shaft 916, optionally against a spring element (not shown). This releases cover element 904a from support/cam 914 to enable moving cover element 904a so that lift 6, 104 advances. On the other (rear) end of lift 6, 104 cover elements 904a are positioned back on supports/cams 914.

Figure 10B:
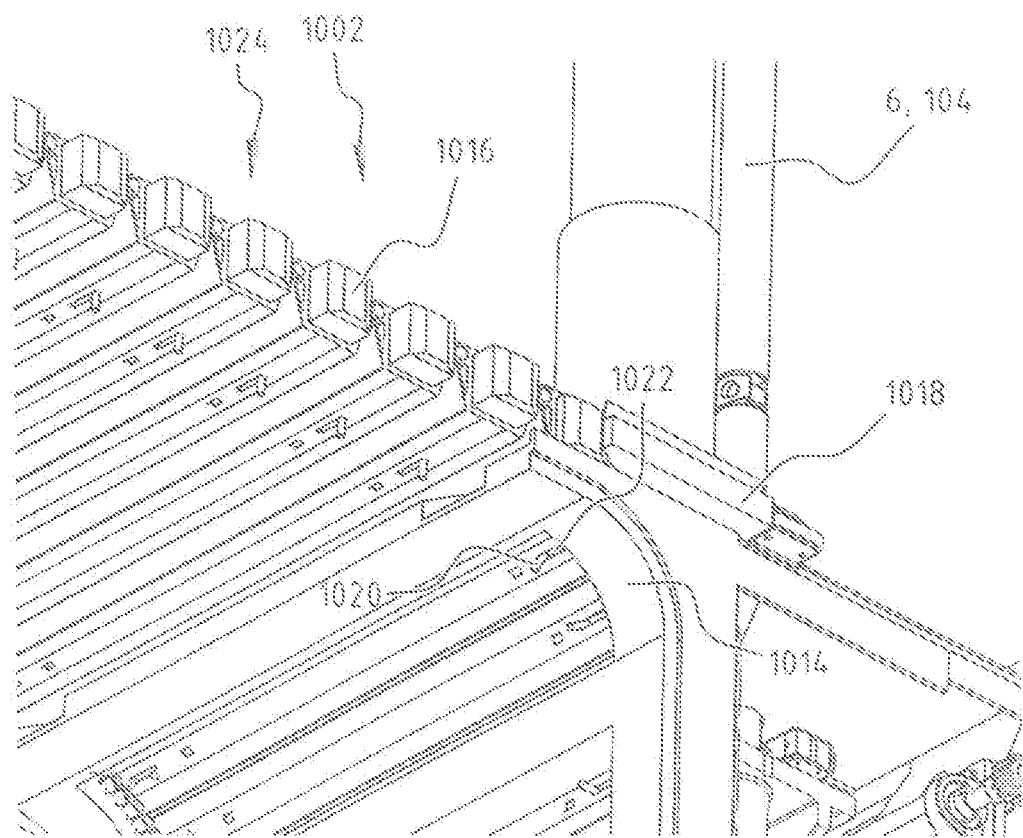

Also cover system 1002 (FIGS. 10A-B) shows an alternative cover embodiment comprising cover 1004 with cover elements 1004a. Cover elements 1004a either cover the pit or are provided in loop(s) 1006. Lifts 6, 104 are provided in or with moving structure 1008 with cover guide 1014 that guides cover elements 1004a between their respective states. Release mechanism 1024 comprises nocks/cams 1016 that are at least partly provided in or to cover element 1004a and in the pit cover state rest on supporting edge 1026 of pit structure 1012. Release mechanism 1024 further comprises release guide 1018 that guides movement of nocks/cams 1016. When moving lift 6, 104 guide 1018 advances and pushes support/cam 1016 inwards and preferably into cover elements 1004a, optionally against a spring element (not shown). Optionally, pins 1020 are provided in grooves 1022 that guide and/or control movement of nocks/cams 1016. The inwards movement of nocks/cams 1016 releases cover element 1004a to enable moving cover element 1004a so that lift 6, 104 advances. On the other (rear) end of lift 6, 104 cover elements 1004a are positioned back on supports/cams 1016.

It will be understood that features from different embodiments can be combined into new embodiments. For example, wheel base measuring system 32 can be applied in combination with other illustrated lifting systems, and modular pit structures 110,112 can also be applied in the other illustrated lifting systems.

When lifting a vehicle it is positioned over the pit. Next, moveable lifts 6, 104 are positioned correctly. A user identifies himself with identification device 142 and/or another suitable system. The appropriated lifts 6, 104 are selected for an individual vehicle to define a lifting set. The lifting operation can be controlled with a local controller 128, 134 and/or remote controller 130 and/or another appropriate controller. Optionally, remaining lifts in the pit that are not used in selection remain available for a further set that can be defined by the same or another user working with the same lifting system.

When installing the lifting system according to the invention a recess suitable for receiving pit 6 is provided in workshop floor 8. Pit structures are provided in the recess. Thereafter the individual moveable lifts 6, 104 are positioned in the pit. Optionally, one or more stationary lifts can also be provided in the pit. However, in a presently preferred embodiment of the invention the use of moveable lifts is preferred. Control system 136 and/or one of its components 128, 130, 132, 134 is provided to enable selecting and preferably also controlling the lifts. Energy system 147 is provided to enable charging of the moveable lifts. Thereafter, a user may operate the lifts for lifting operations of one or more vehicles.

The present invention is by no means limited to the above described preferred embodiments thereof. The rights sought are defined by the following claims, wherein the scope of which many modifications can be envisaged. For example, it is explicitly mentioned that combinations of the illustrated embodiments, including combination of individual features thereof, are possible.

The invention claimed is:

1. An in-ground lifting system for lifting a vehicle, comprising:
   one or more lifts comprising at least one moveable lift;
   a support structure for mounting the at least one movable lift in a pit;
   a moving drive configured for moving the at least one movable lift in a longitudinal direction in the pit;
   a lifting drive configured for lifting the one or more lifts for raising and/or lowering the vehicle; and
   a cover configured for covering the pit, wherein the cover comprises a plurality of cover elements and a movable support element having at least one loop movable in the longitudinal direction with the at least one movable lift, wherein each of the cover elements extends in a width direction of the pit, and wherein the cover elements are configured to move between a pit covering state wherein the cover elements cover the pit and a lift moving state wherein the cover elements move into the at least one loop such that the at least one moveable lift passes over and/or by the cover elements, wherein the cover elements move from the pit covering state to the lift moving state when the at least one movable lift moving through the pit is approaching.

2. The in-ground lifting system according to claim 1, wherein the cover further comprises a release mechanism that is configured for allowing the cover elements to move from the pit covering state to the lift moving state, wherein the cover elements are positioned to allow the at least one moveable lift to pass.

3. The in-ground lifting system according to claim 2, wherein the release mechanism comprises the moveable support element.

4. The in-ground lifting system according to claim 3, wherein the release mechanism further comprises a spring element.

5. The in-ground lifting system according to claim 3, wherein the moveable support element is included in and/or attached to the cover elements.

6. The in-ground lifting system according to claim 3, wherein the moveable support element is provided in and/or attached to the pit.

7. The in-ground lifting system according to claim 3, wherein the moveable support element is retractable.

8. The in-ground lifting system according to claim 3, wherein the moveable support element is provided with a rotation axis that extends in a substantially horizontal direction.

9. The in-ground lifting system according to claim 3, wherein the moveable support element is provided with a rotation axis that extends in a substantially vertical direction.

10. The in-ground lifting system according to claim 1, wherein the cover element is provided with a cover element rotation axis that extends in a substantially horizontal direction at or close to one of the ends of the cover element.

11. The in-ground lifting system according to claim 1, wherein the cover further comprises a support system configured for supporting the cover element.

12. The in-ground lifting system according to claim 1, further comprising a charging system.

13. The in-ground lifting system according to claim 1, wherein the one or more lifts comprises two or more sets of lifts, wherein each set is configured for lifting the vehicle.

14. The in-ground lifting system according to claim 1, wherein at least one of the one or more lifts comprise a piston type lifting device.

15. The in-ground lifting system according to claim 1, wherein at least one of the one or more lifts comprise a scissor type lifting device.

16. An in-ground lifting system for lifting a vehicle, comprising:
one or more lifts comprising at least one moveable lift;
a support structure for mounting the at least one movable lift in a pit;
a moving drive configured for moving the at least one movable lift in a longitudinal direction in the pit;
a lifting drive configured for lifting the one or more lifts for raising and/or lowering the vehicle; and
a cover configured for covering the pit, wherein the cover comprises a plurality of cover elements and a movable support element having at least one loop movable in the longitudinal direction with the at least one movable lift, wherein each of the cover elements extends in a width direction of the pit, and wherein the cover elements are configured to move between a pit covering state wherein the cover elements cover the pit and a lift moving state wherein the cover elements move into the at least one loop such that the at least one moveable lift passes over and/or by the cover elements, wherein the cover elements move from the pit covering state to the lift moving state when the at least one movable lift moving through the pit is approaching,
wherein the cover further comprises a release mechanism that is configured for allowing the cover elements to move from the pit covering state to the lift moving state, wherein the cover elements are positioned to allow the at least one moveable lift to pass, wherein the release mechanism comprises the moveable support element, and wherein the release mechanism further comprises a spring element.

17. The in-ground lifting system according to claim 16, wherein the moveable support element is retractable.

18. The in-ground lifting system according to claim 16, further comprising a charging system.

19. A method for lifting a vehicle, the method comprising the steps of:
providing an in-ground lifting system for lifting the vehicle, the in-ground lifting system comprising:
one or more lifts comprising at least one moveable lift;
a support structure for mounting the at least one movable lift in a pit;
a moving drive configured for moving the at least one movable lift in a longitudinal direction in the pit;
a lifting drive configured for lifting the one or more lifts for raising and/or lowering the vehicle; and
a cover configured for covering the pit, wherein the cover comprises a plurality of cover elements and a movable support element having at least one loop movable in the longitudinal direction with the at least one movable lift, wherein each of the cover elements extends in a width direction of the pit, and wherein the cover elements are configured to move between a pit covering state wherein the cover elements cover the pit and a lift moving state wherein the cover elements move into the at least one loop such that the at least one moveable lift passes over and/or by the cover elements, wherein the cover elements move from the pit covering state to the lift moving state when the at least one movable lift moving through the pit is approaching;
positioning the at least one movable lift; and
lifting the vehicle.

* * * * *